US007749062B2

(12) United States Patent
Gatto et al.

(10) Patent No.: US 7,749,062 B2

(45) Date of Patent: Jul. 6, 2010

(54) WARPED-CONDUIT RACER GAME

(75) Inventors: Jean-Marie Gatto, London (GB); John Papanastasiou, Croydon (GB); Paul Girard, London (GB); Sylvie Linard, London (GB); Thierry Brunet de Courssou, Palo Alto, CA (US)

(73) Assignee: Mudalla Technology, Inc., Palo Alto, CA (US)

( * ) Notice: Subject to any disclaimer, the term of this patent is extended or adjusted under 35 U.S.C. 154(b) by 1420 days.

(21) Appl. No.: 10/837,017

(22) Filed: Apr. 30, 2004

(65) Prior Publication Data

US 2005/0245307 A1 Nov. 3, 2005

Related U.S. Application Data

(60) Provisional application No. 60/466,882, filed on Apr. 30, 2003.

(51) Int. Cl.
*A63F 13/00* (2006.01)

(52) U.S. Cl. ........................................................ 463/16

(58) Field of Classification Search ............. 463/15–21, 463/58, 30–33

See application file for complete search history.

(56) References Cited

U.S. PATENT DOCUMENTS

| | | | | |
|---|---|---|---|---|
| 4,260,159 | A * | 4/1981 | Hoffman | 463/22 |
| 4,321,673 | A * | 3/1982 | Hawwass et al. | 463/22 |
| 4,391,442 | A * | 7/1983 | Levy | 273/142 E |
| 4,643,425 | A * | 2/1987 | Herzenberger | 463/17 |
| 5,226,655 | A * | 7/1993 | Rickabaugh | 273/246 |
| 5,501,455 | A * | 3/1996 | Hirata et al. | 463/61 |
| 5,755,440 | A * | 5/1998 | Sher | 273/142 E |
| 5,823,872 | A * | 10/1998 | Prather et al. | 463/6 |
| 6,059,657 | A * | 5/2000 | Oh et al. | 463/6 |
| 6,406,369 | B1 | 6/2002 | Baerlocher et al. | |
| 6,409,172 | B1 * | 6/2002 | Vancura | 273/256 |
| 6,471,208 | B2 | 10/2002 | Yoseloff et al. | |
| 6,890,255 | B2 * | 5/2005 | Jarvis et al. | 463/17 |
| 6,918,830 | B2 * | 7/2005 | Baerlocher | 463/16 |
| 7,195,560 | B2 * | 3/2007 | DeMar et al. | 463/20 |
| 7,294,054 | B2 * | 11/2007 | Schugar et al. | 463/6 |
| 2002/0119815 | A1 | 8/2002 | Lyons | |
| 2004/0087357 | A1 * | 5/2004 | Johnson | 463/17 |
| 2005/0159205 | A1 * | 7/2005 | Kukita | 463/17 |
| 2006/0019735 | A1 * | 1/2006 | Toyoda | 463/17 |
| 2006/0097446 | A1 * | 5/2006 | Toyoda | 273/144 R |
| 2006/0163806 | A1 * | 7/2006 | Toyoda | 273/142 R |
| 2007/0075490 | A1 * | 4/2007 | Gak | 273/146 |
| 2007/0129133 | A1 * | 6/2007 | Bansemer et al. | 463/16 |

(Continued)

OTHER PUBLICATIONS

International Preliminary Report on Patentability mailed Jan. 13, 2008, in corresponding International Application No. PCT/USO4/13743 (4pgs).

(Continued)

*Primary Examiner*—Scott Jones
(74) *Attorney, Agent, or Firm*—Young Law Firm, P.C.

(57) ABSTRACT

An electronic game features captivating animations and rich selection criteria while offering the simplicity that makes the popularity of legacy games such as roulette, wheel of fortune and multi-line fruit machines casino games. One implementation of the present electronic game is configured as a 2D game tailored for slot machines. Solid 3D variants of the game extending beyond the established video slot machine form-factor are also described.

28 Claims, 43 Drawing Sheets

U.S. PATENT DOCUMENTS

2007/0293295 A1 * 12/2007 Kim .............................. 463/17
2008/0004098 A1 * 1/2008 Bennett ........................ 463/16

OTHER PUBLICATIONS

International Search Report mailed Sep. 8, 2005, in related internatlonal application No. PCT/USO4/13743, filed Apr. 30, 2004 (2pgs).

Written Opinion of the International Searching Authority mailed Sep. 8, 2005, in related international application No. PCT/USO4/13743, filed Apr. 30, 2004 (3pgs).

Canadian Office Action of Apr. 2, 2009 in related CA application 2,523,644.

* cited by examiner

1200
INFINITY
Stake
$ 20.00
Balance
$ 250.00
remove all bets
remove chip
25¢
$1
$5
$10
$25
$50
$100
Straight Bet : 60/1
Infinity Bet : 60/1
TABLE LIMITS
Help
Menu
Collect
Repeat Bet
Bet
1202
1204
1206
1208
1210
1212
1214
1216
1218
1220
1222
1224
1226
1228
1230
1232
1234
1236
1238
1240

WARPED-CONDUIT RACER GAME

This application discloses and claims subject matter disclosed in the prior provisional application Ser. No. 60/466,882, filed Apr. 30, 2003, from which this application claims benefit under 35 U.S.C. §120.

BACKGROUND OF THE INVENTION

1. Field of the Invention

This invention relates generally to the field of free or pay computer-controlled games, either games of skills or games of chance.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright 2004, Cyberscan Technology Inc., All Rights Reserved.

3. Description of the Related Art

The vast majority of computer games of chance and table games such as found in casinos are based on, or directly derived from, fruit slot machines, poker slot machines, roulette, poker (table and slot) and wheel of fortune. Fruit machines are shifting to "character" fruit machines in which the fruits are replaced with well-known characters portrayed in movies, cartoons or TV series. Fruits are also replaced with various familiar objects such as dice as well as animals. Multi-line fruit-type machines are quickly replacing basic fruit-type machines as they offer a richer play to the player. Basic video poker machines are also evolving to offer more intricate combinations of bets to satisfy more sophisticated players.

Interestingly, highly sophisticated Gameboy®, Playstation®, Sega®, Xbox® and shoot-'em-up type games have not made any in-road into the game of chance arena. Consequently, no new successful "killer" game appears to have been introduced in the game of chance arena in a long time.

SUMMARY OF THE INVENTION

The game includes a warped-conduit that guides a computer-controlled racer that is controlled by a random event such as the outcome of an electronic random number generator. The conduit is divided in segments, predetermined groups of segments and predetermined groups of sections of segments that are marked with computer-controlled luminous numbers, color, shapes, symbols, objects, surfaces, sounds, and personages, and predetermined combination thereof, hereafter collectively referred to as features.

A player may place a bet on a selected feature, and then initiate a game by pressing a "Play" button that triggers the racer's start. When the racer stops on a location, the selected feature or features linked to this location are highlighted and a prize is determined in accordance with a pay table.

In a first embodiment, the conduit has the shape of the "infinity" mathematical symbol projected onto a surface, to create a 2D game called "Infinity" tailored for slot machines.

In a second embodiment, the conduit is a 3D solid toroid warped into the shape of the infinity symbol ∞ with its outer surfaces tiled with arcuate luminous panels composed of computer-controlled lighted translucent color panels, color LEDs, or flexible color LCD panels, or a combination thereof, for rendering the required visual effects. Solid 3D variants of the game extending beyond the established video slot machine form-factor are also described.

In a third embodiment, a 2D or 3D mosaic paneling of a plurality of warped conduits allow a player to combine bets on features over a plurality of games, each of which features a separate racer, to enable significantly higher returns. Alternatively, similar high-return scenarios may be obtained with a warped conduit that enables multiple racers to race simultaneously in the same conduit, either by having racers racing in separate tracks, or by having racers rendered in different colors in a single track.

In a fourth embodiment, the conduit is warped into the shape of a Möbius strip.

In a fifth embodiment, a table game version may be produced, whereby bets are made by positioning tokens on a table inlayed with the projection of the conduit and/or by projections of the features, and whereby a video or solid 3D model of the conduit is used to animate the racer and display the winning features and linked features.

In a sixth embodiment, a vertigo effect video insert may be generated by displaying a "following-observer" perspective view of the racer while racing. Other embodiments and features of the present inventions are described herein.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
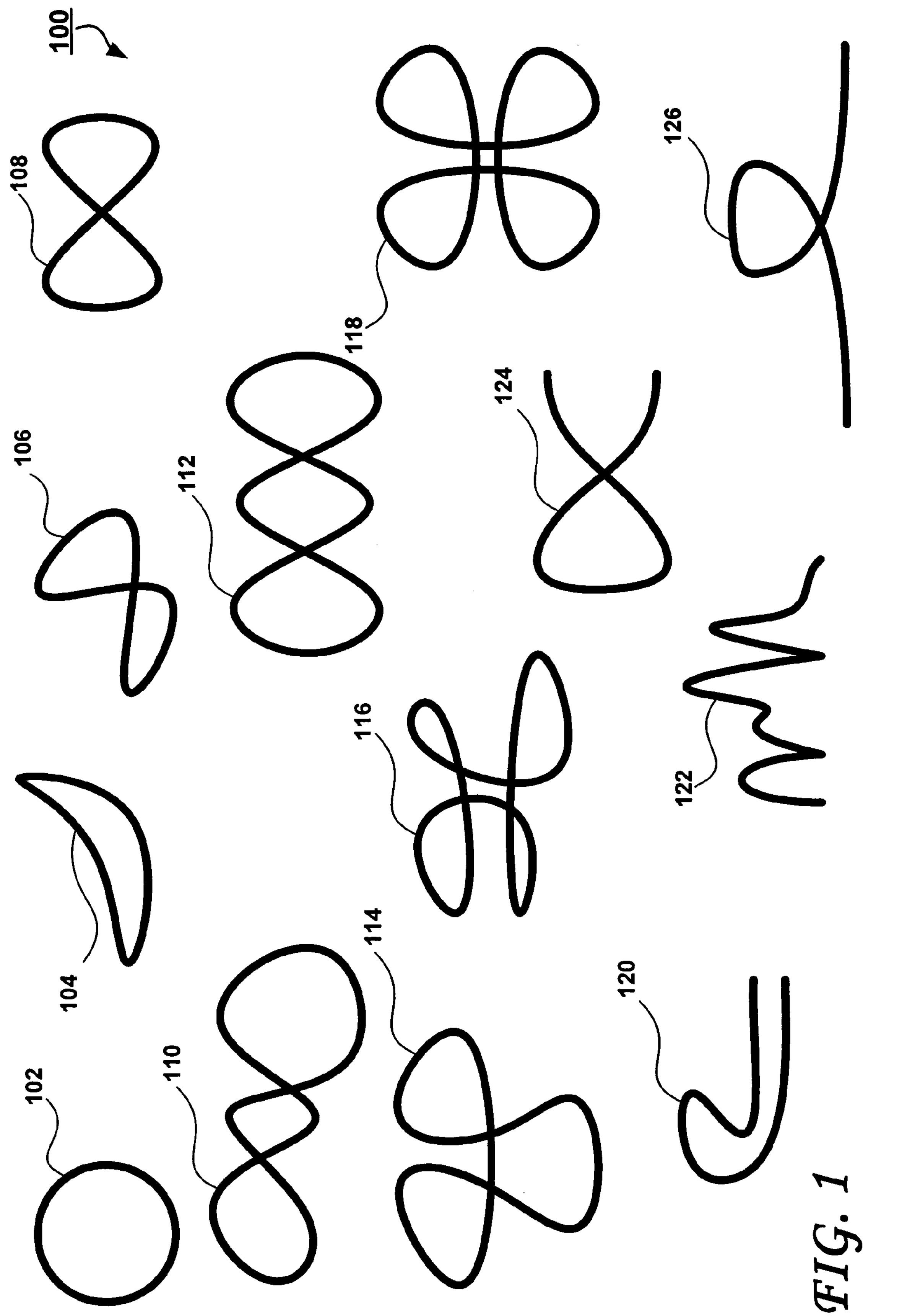
FIG. 1 shows examples of paths for shaping the conduit, according to embodiments of the present invention.

FIG. 1 at 100 illustrates various paths that may shape the conduit within which a racer may travel, according to an embodiment of the present invention. According to embodiments of the present invention, a computer-controlled racer may follow such a path or paths. In the case of a closed loop path such as shown at 102, 104, 106, 110, 112, 114, 116 or 118, the racer may run in one direction until it stops. In the case of an open loop path such as shown at 120, 122, 124 or 126, the racer may run in one direction until it reaches the end, and then back in the opposite direction. This motion may repeat in an oscillatory fashion until the racer stops. In addition, the racer may change direction at any time during its race under a random event control, much in the same manner that insects such as a common house fly frequently changes direction during flight. The direction in which the racer was running prior to stopping may also be a bet feature.

The path 108 has two loops and is typically identified with the "infinity" mathematical symbol "∞". Path 112, 114 and 118 have a greater number of loops and are referred to herein as "beyond infinity" symbols. It is to be understood that the paths illustrated in FIG. 1 are exemplary in nature only, and that the present conduits may be modeled on many other paths within the context of the present inventions.

Figure 2:
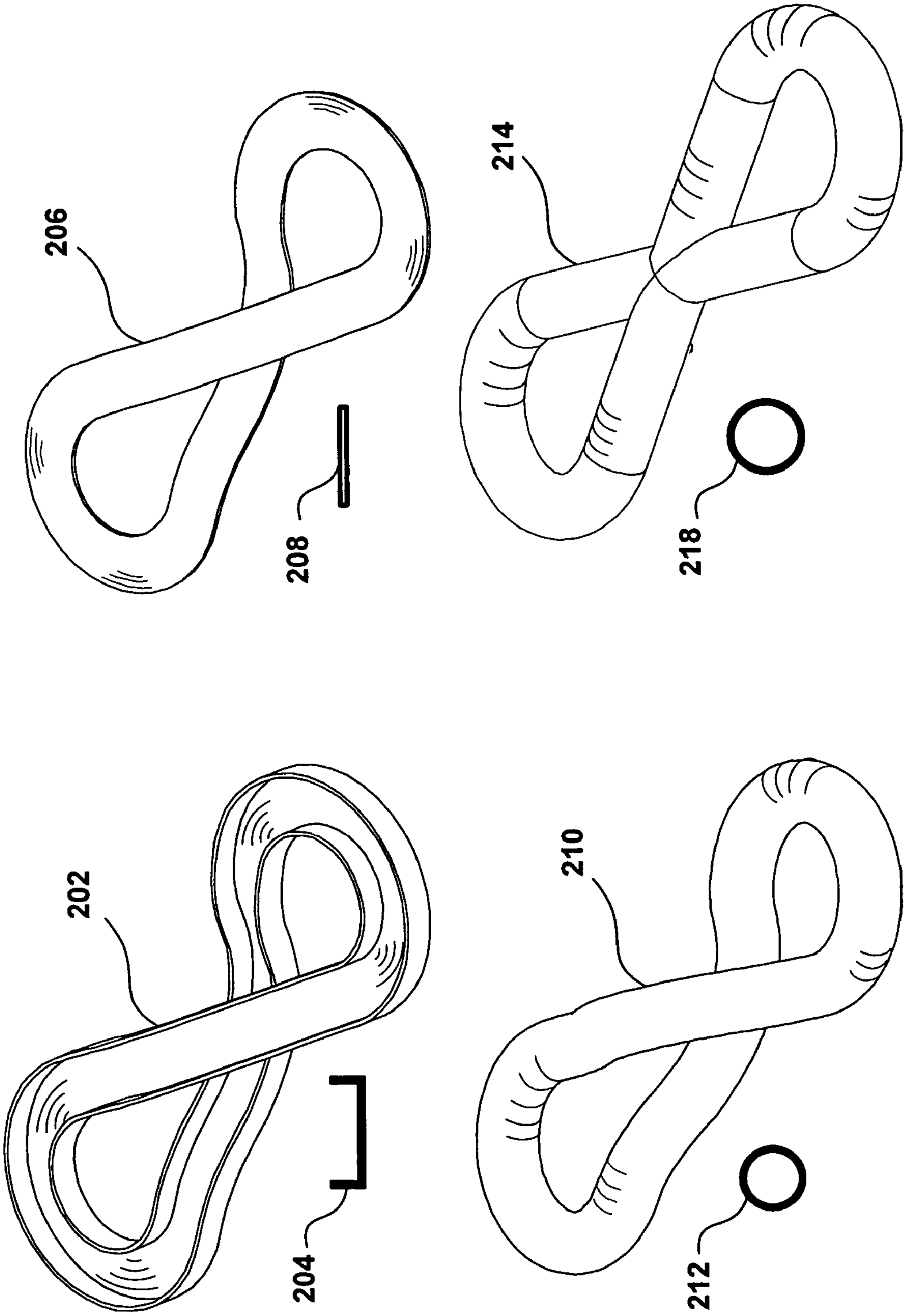
FIG. 2 shows examples of possible sections for shaping the conduit, according to embodiments of the present invention.

FIG. 2 illustrates various cross-sectional profiles that may shape a conduit. The path used to shape the conduit in this illustration is the "infinity" symbol. Conduit 202 has a "U" cross-sectional profile 204. Conduit 206 has a flat cross-sectional profile 208. Conduits 210 and 214 have circular cross-sectional profiles 212 and 218. Conduit 210 has no intersection while conduit 214 intersects. When the conduit has a U-shaped cross-sectional profile 204 or of a flat cross-sectional profile 208, it may be named a track. Conduits may have other cross-sectional profiles, the present inventions not being limited to the exemplary cross-sectional profiles shown in FIG. 2

Figure 3:
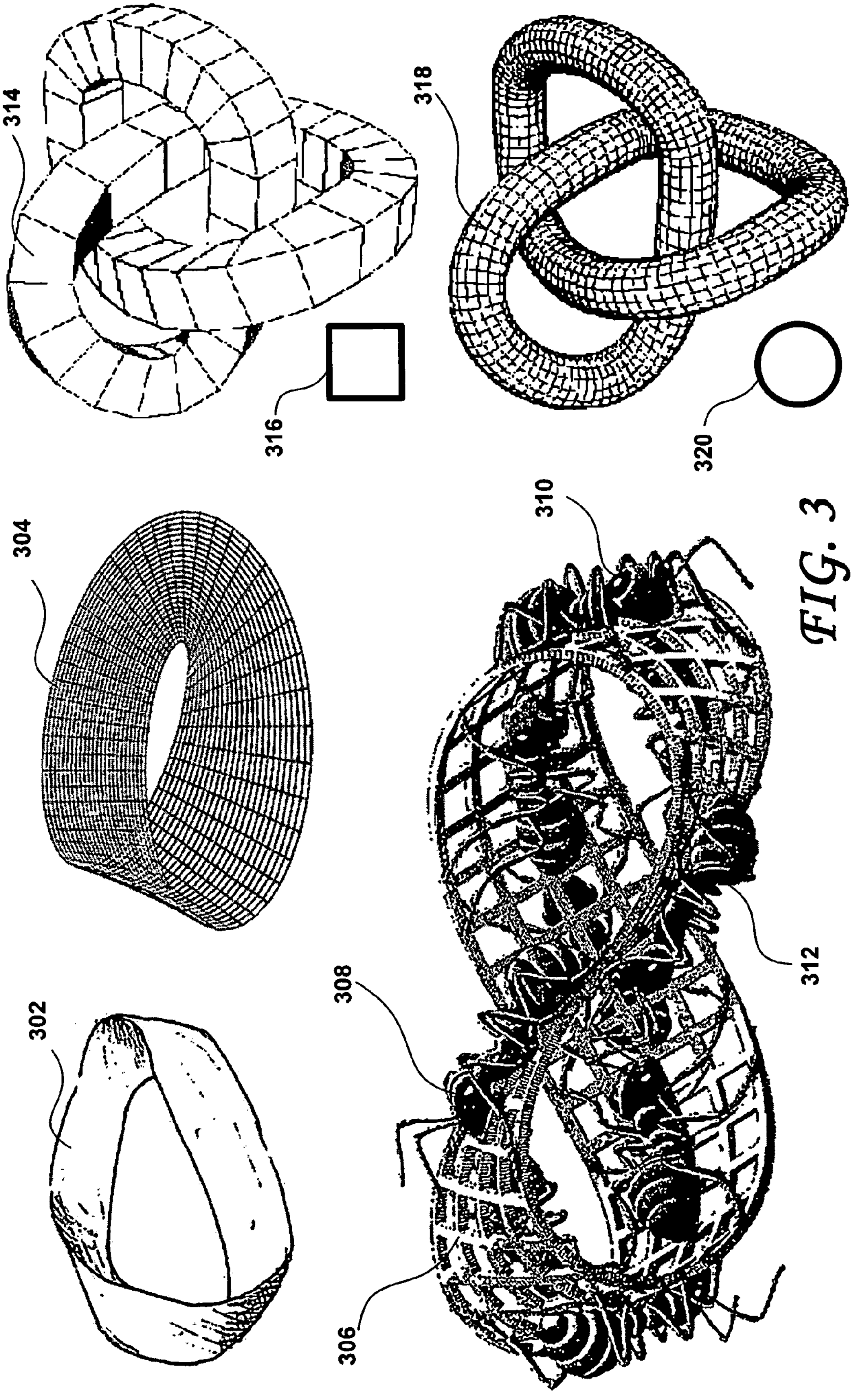
FIG. 3 shows examples of 3D warped conduits suitable for use in conjunction with embodiments of the present invention.

FIG. 3 illustrates some examples of 3D warped conduits that may guide the course of the racer. Drawings 302, 304 and 306 are examples of Möbius strips. The Möbius strip is named after the German mathematician August Ferdinand Möbius, who was a pioneer in the field of topology in the 1800s. A Möbius strip is characterized by a warped surface that may be formed, for example, by taking for example a long, rectangular strip of paper, rotating the ends 180° with respect to one another, and joining the ends together to form a loop. The Möbius strip is a two-dimensional surface that has only one side. This may be demonstrated by drawing a line down the middle of the loop; the line will eventually end up where it began after traveling to what appears to be the inner side and outer side of the band. Another curious property is that if the Möbius strip is cut along the line down the middle of the loop, it will become a single two-sided loop, instead of falling apart into two loops. Drawing 304 is a mathematical rendering of the Möbius strip. Embodiments of the present invention use the shape of a Möbius strip as a conduit for the racer as illustrated in FIG. 3 in which the racer or racers are embodied as a plurality of ants 308, 310 and/or 312 running over a meshed Möbius strip 306. The apparent side of the strip on which the ant stops may also be a bet feature. Drawing 314 is an example of an intricate conduit with a square cross-sectional profile 316 that may guide the racer. Drawing 318 is the same intricate conduit but rendered with a circular cross-sectional profile 320.

A conduit may be used to guide the course of the racer. In addition, a conduit's surface may be used as a support for rendering various features along the path. Features and combinations of linked features may be used to enable a player to place bets on the predicted location where the racer will stop.

Figure 4:
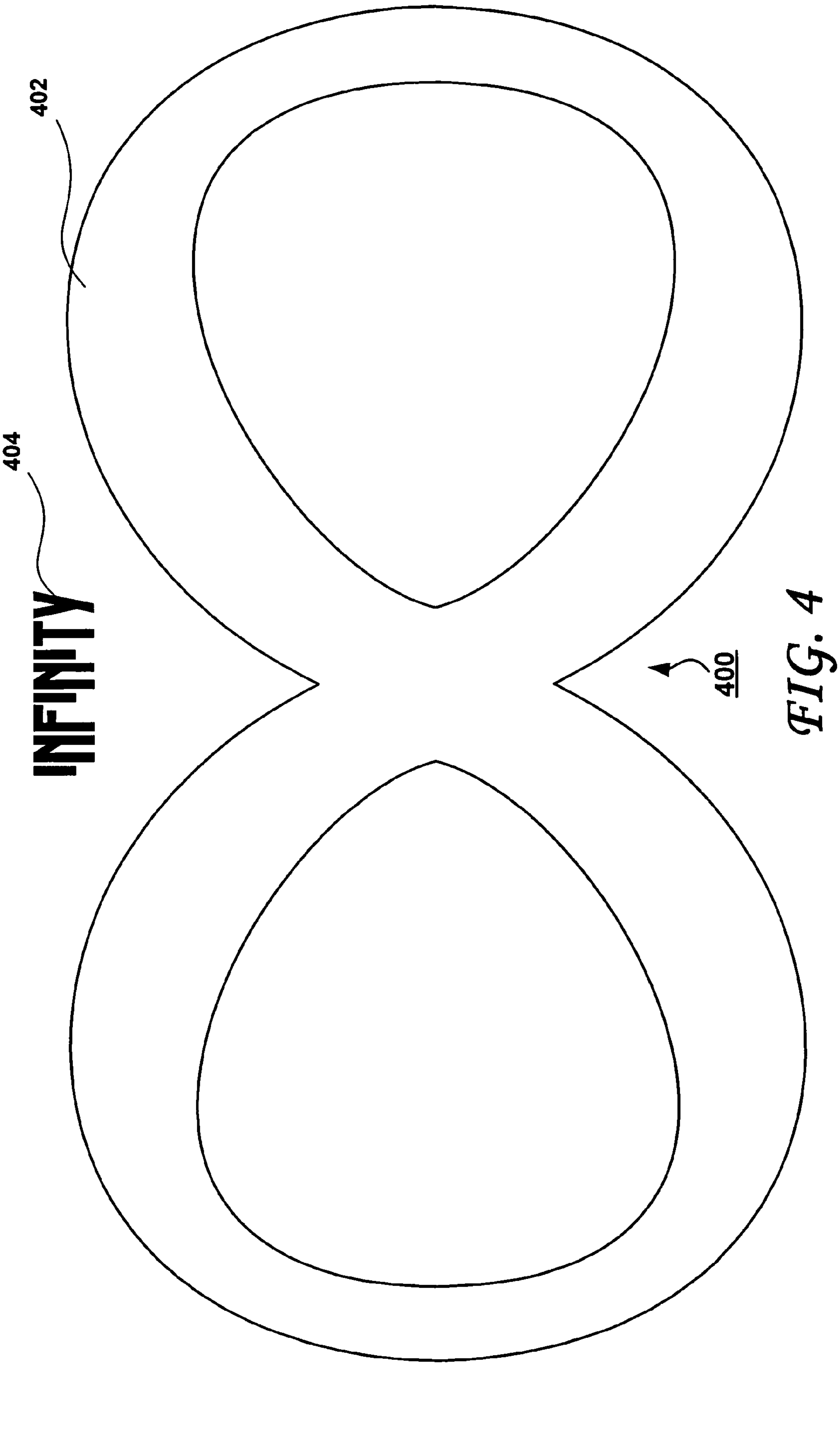
FIG. 4 shows a 2D conduit shaped into the Infinity symbol, according to an embodiment of the present invention.

FIG. 4 illustrates a 2D conduit of an embodiment of the present invention. The conduit 400 has the shape of the infinity symbol projected onto a flat surface and is identified by numeral 402. For easier identification by players, a textual infinity logo 404 may be shown.

Figure 5:
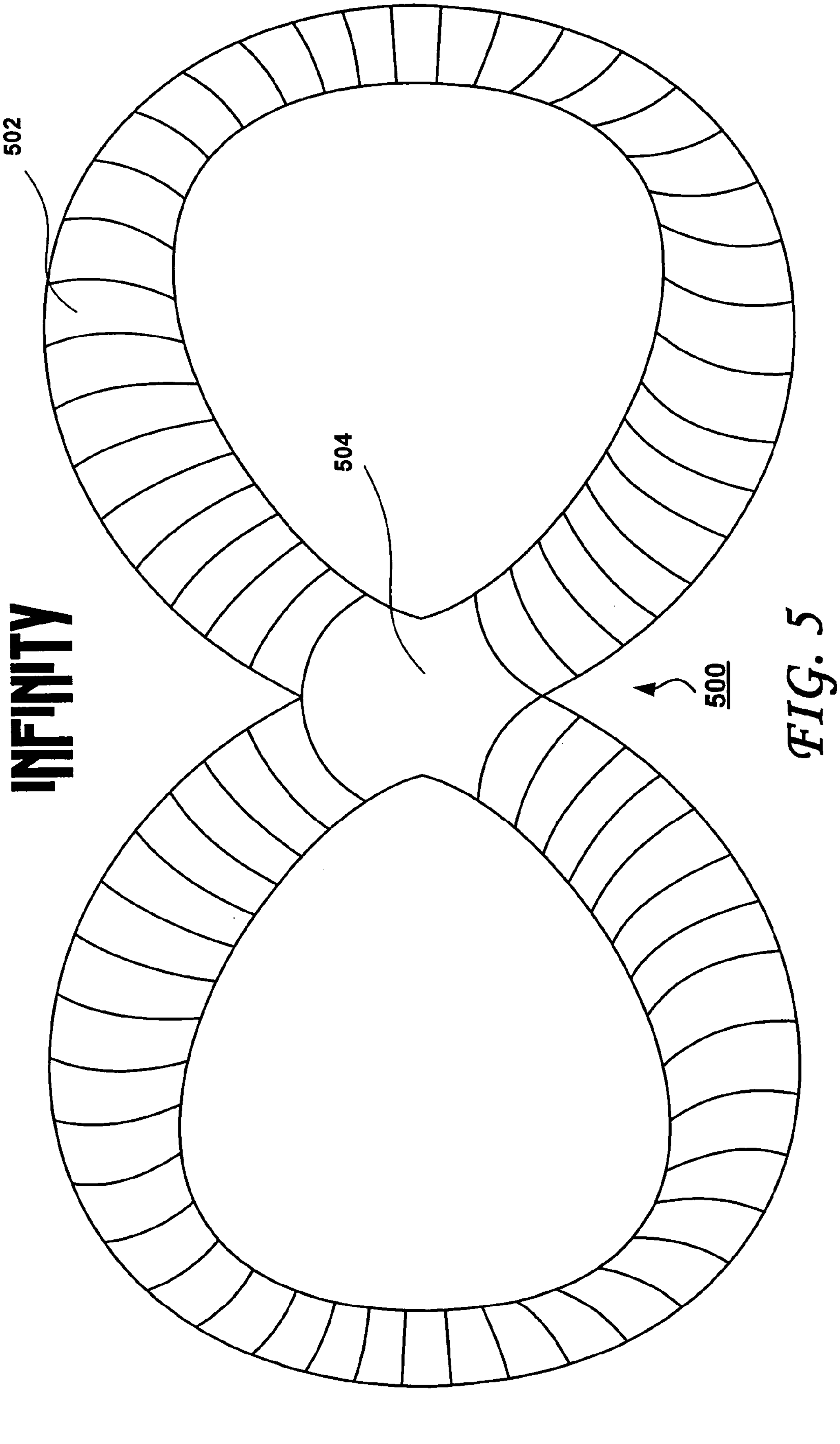
FIG. 5 shows segmenting of the Infinity-shaped conduit, according to an embodiment of the present invention.

FIG. 5 illustrates segmentation of the conduit 500 in predetermined segments, according to a further aspect of the present invention. One of the plurality of segments is identified by numeral 502. The intersecting segment 504 is a notable segment nicknamed "Infinity" in one embodiment of the game.

Figure 6:
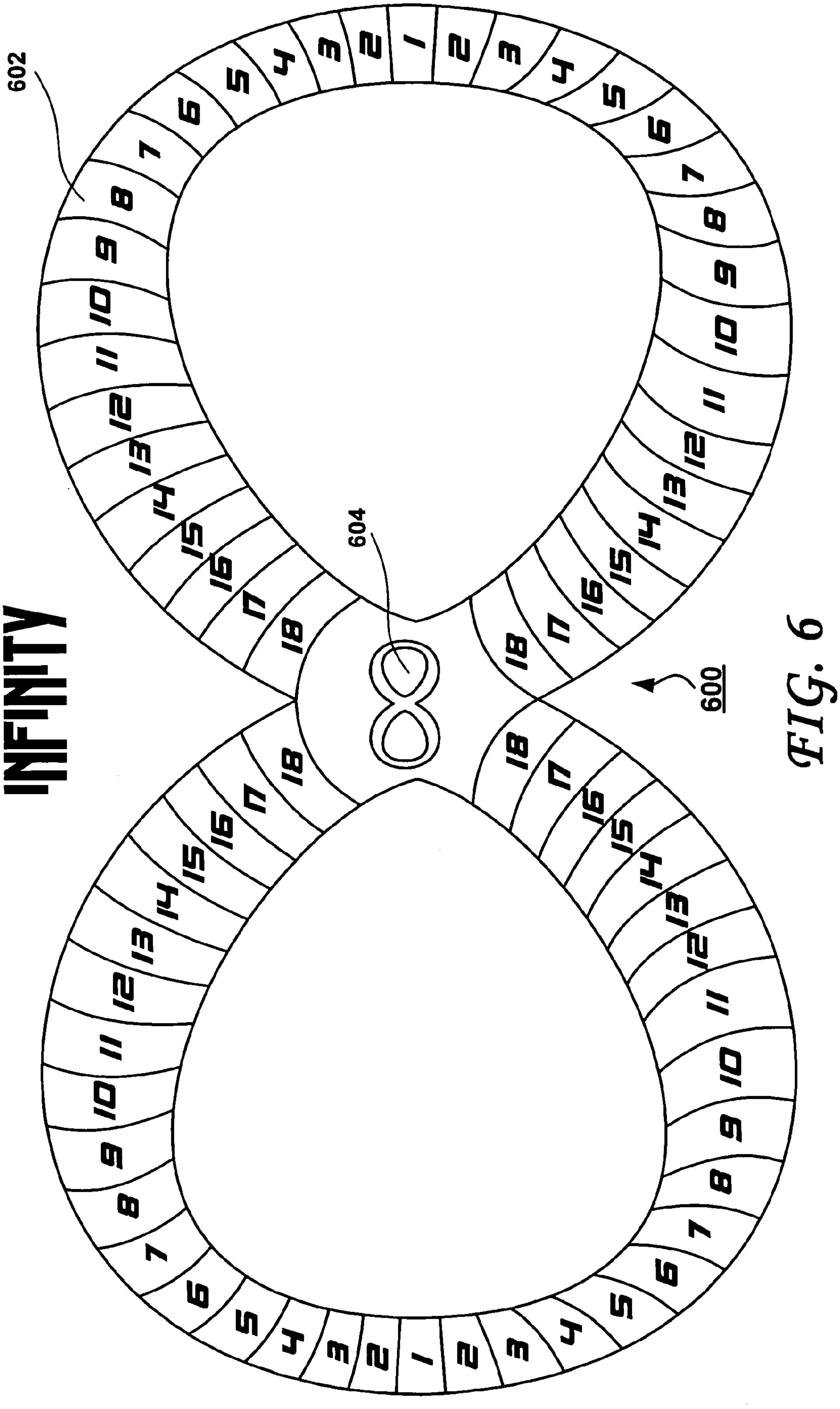
FIG. 6 shows allocations of numbers to the segments (the middle segment being allocated to the Infinity symbol), according to an embodiment of the present invention.

FIG. 6 at 600 shows one possible allocation of numbers to the segments, according to an embodiment of the present invention. In this illustrative example, segment 602 is allocated number 8 and the middle segment 604 is labeled "Infinity" or ∞.

Figure 7:
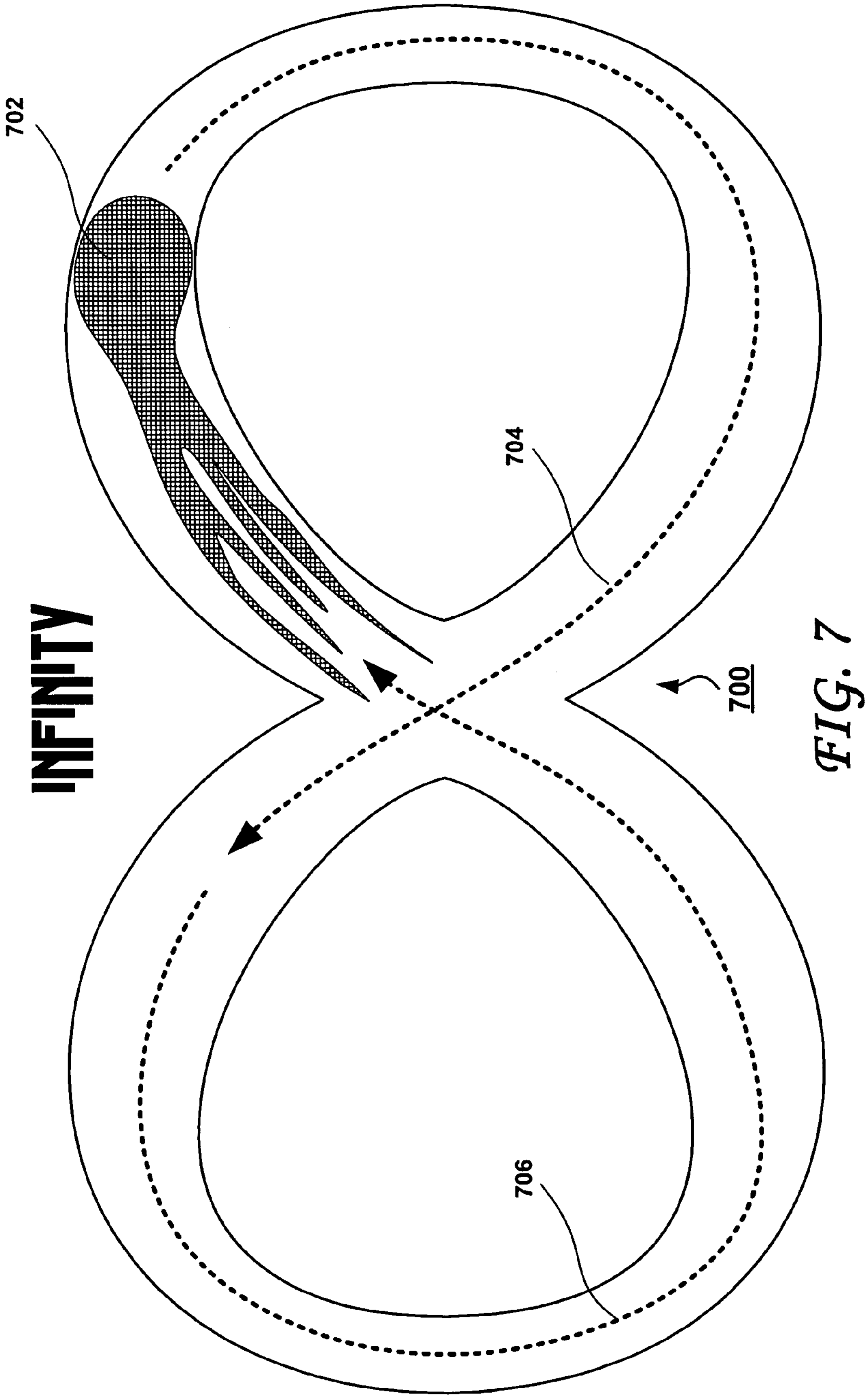
FIG. 7 shows "Shooting-Star"-like luminous racer racing within the conduit, according to an embodiment of the present invention.

FIG. 7 illustrates a racer racing within the conduit 700, according to an embodiment of the present invention. In this embodiment, the racer races at a very high speed and a "shooting-star" like effect 702 is rendered in which the racer is represented by a high intensity luminous head followed by a powdery/dusty trailing luminous tail. The racer races in the directions of the arrows 704 and 706.

Figure 8:
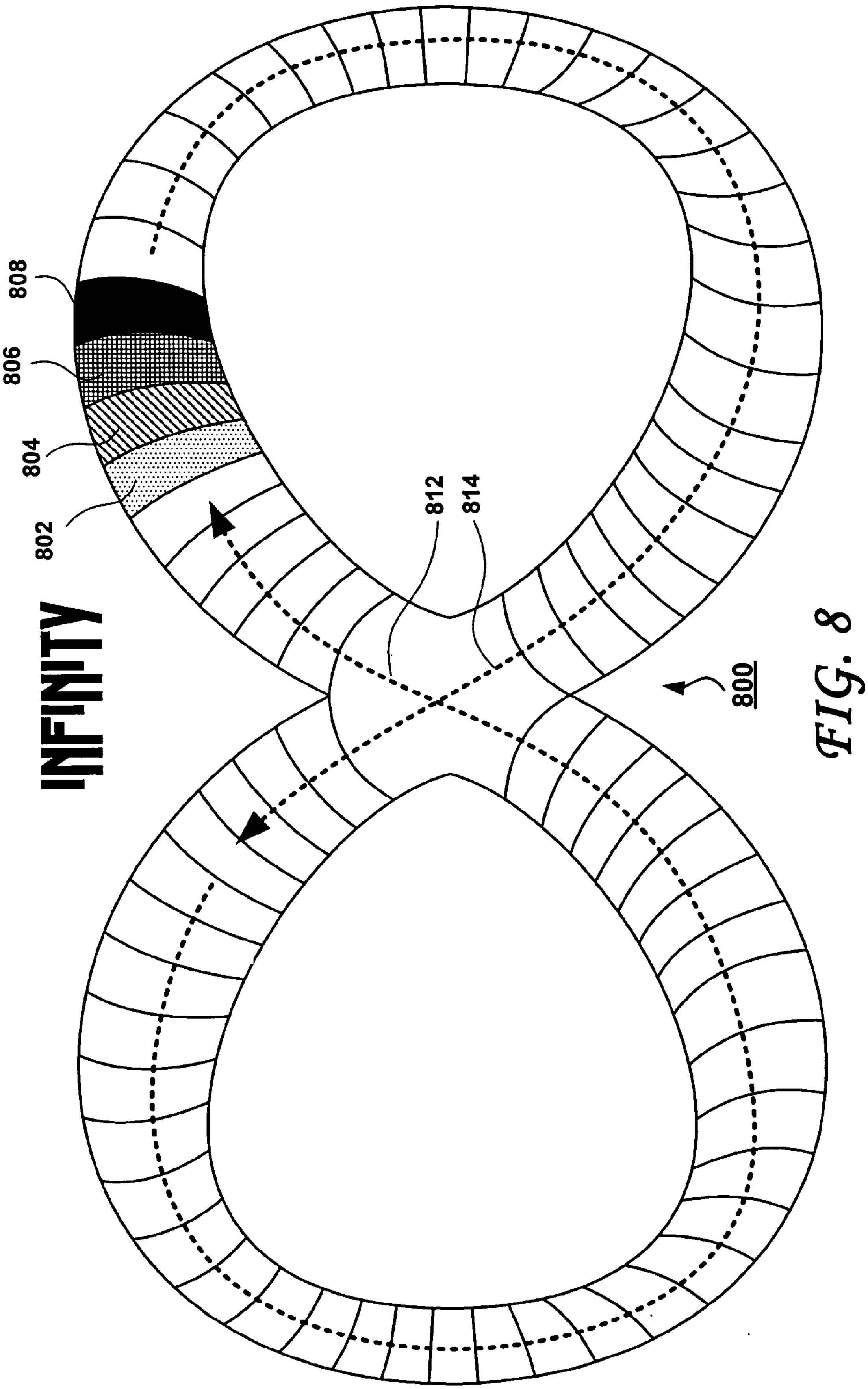
FIG. 8 shows a motion-blur effect of the racer by controlling the luminous intensity of the segments, according to an embodiment of the present invention.

FIG. 8 illustrates a motion-blur effect of the racer that may be obtained by controlling the luminous intensity of the segments of the conduit 800. Indeed, the aforementioned shooting-star effect may be rendered as a series of segments 802, 804, 806, 808 that are illuminated with varying intensity all along a path depicted by arrows 812 and 814. A sophisticated video motion blur technique may also advantageously be applied.

Figure 9:
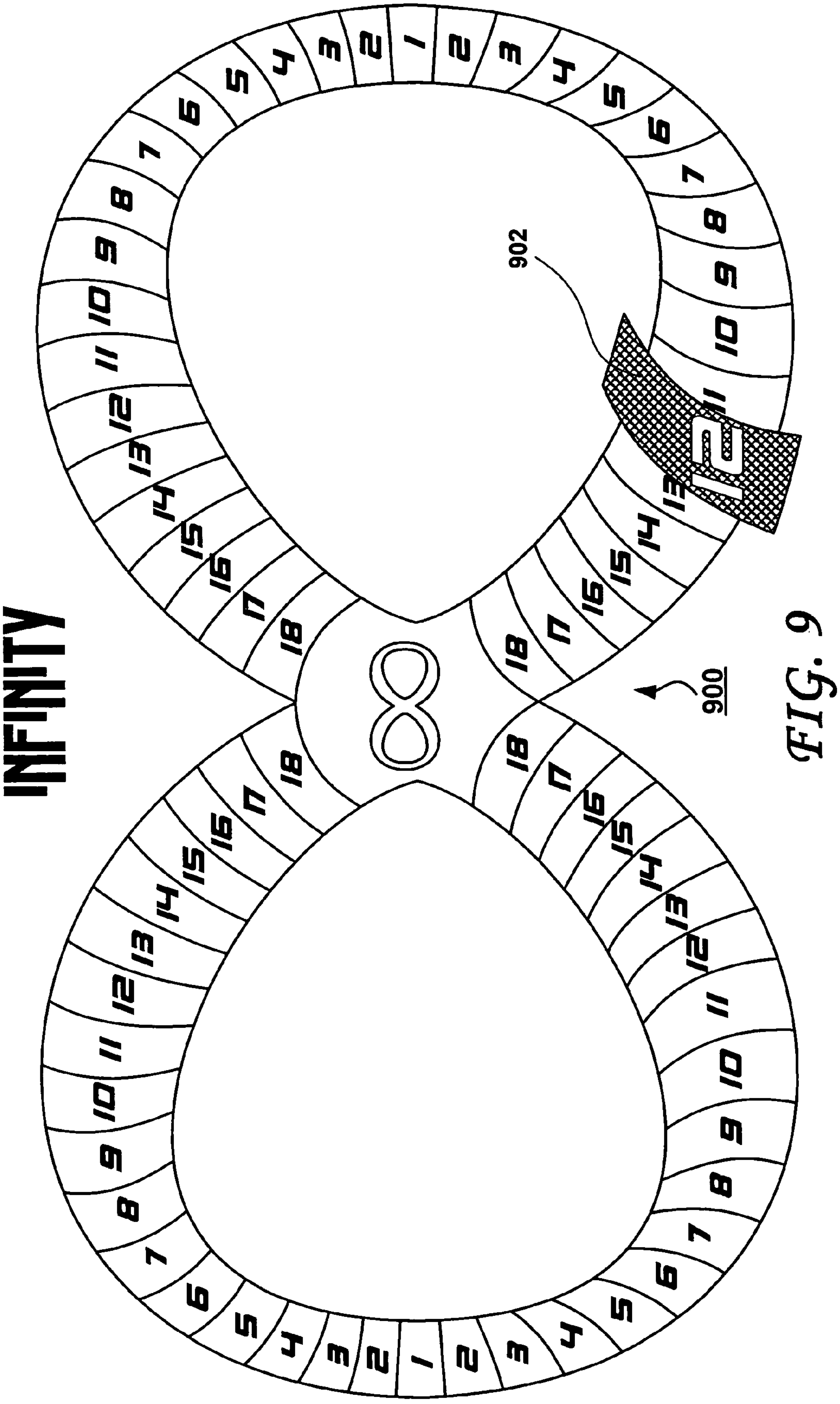
FIG. 9 shows a racer stop highlight, according to an embodiment of the present invention.

FIG. 9 illustrates a conduit 900 in which the highlight 902 indicates the location where the racer stopped, according to an embodiment of the present invention.

Figure 10:
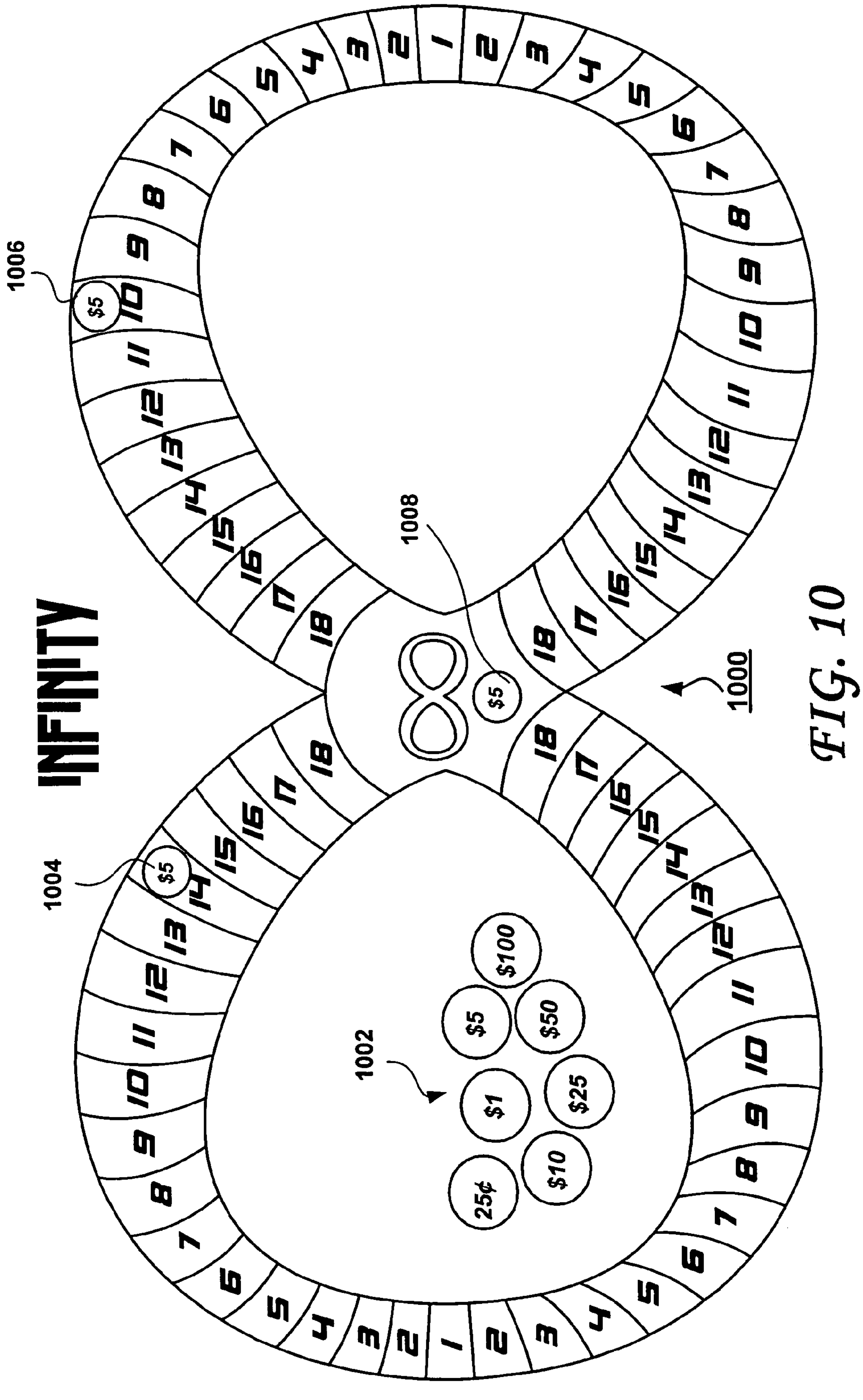
FIG. 10 shows the manner in which bets may be placed by placing tokens, according to an embodiment of the present invention.

FIG. 10 illustrates at 1000 the manner in which bets may be made by placing tokens on specific locations on the segments, according to embodiments of the present invention. A pool of money 1002 is accumulated at some location. In the example shown in FIG. 10, a $5 bet is placed on the segment numbered 14 as shown at reference 1004. Another $5 bet is placed on the segment numbered 10, shown at reference numeral 1006, and another $5 bet is placed on the Infinity middle segment, as shown at 1008.

Figure 11:
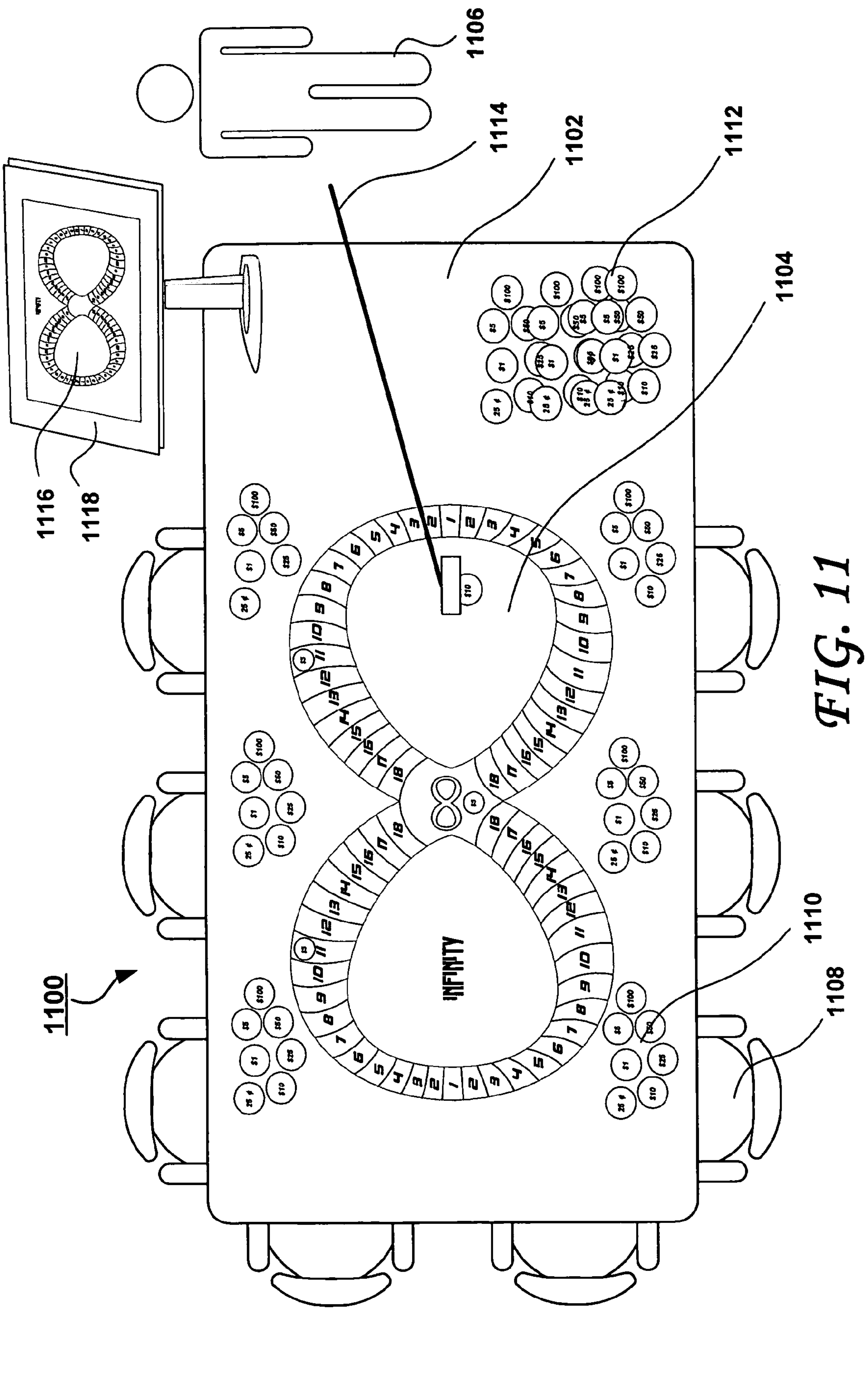
FIG. 11 shows an example of a casino table game, according to an embodiment of the present invention.

FIG. 11 illustrates another embodiment of the present invention, in which the game is played on a casino game table 1100. The infinity conduit may be inlayed on the surface top 1104 of the table around which players may watch and play the game (reference numeral 1108 denotes chairs on which the players may sit). Players may place tokens on the infinity segments, features or linked aggregates of features (features and linked aggregates thereof as well as play rules are described hereunder) to place bets. The table dealer 1106 may recuperate or distribute the tokens using a casino table rake 1114. An animation of the game 1116 may be rendered on a video display 1118 that is visible to all the players and is controlled by a computer (not shown). To start the game, the dealer 1106 may actuate a start button that triggers the computer to start the race. The course of the racer along the infinity conduit 1116 and cycle through start, acceleration, and deceleration phases until the racer comes to a complete stop under the control of the computer. The location where the racer stops may be advantageously controlled by a random number generator (RNG). The random number generator may be an electronic generator or any sort of other source of randomness such as dices, lottery/keno/bingo style ball drawings.

Figure 42:
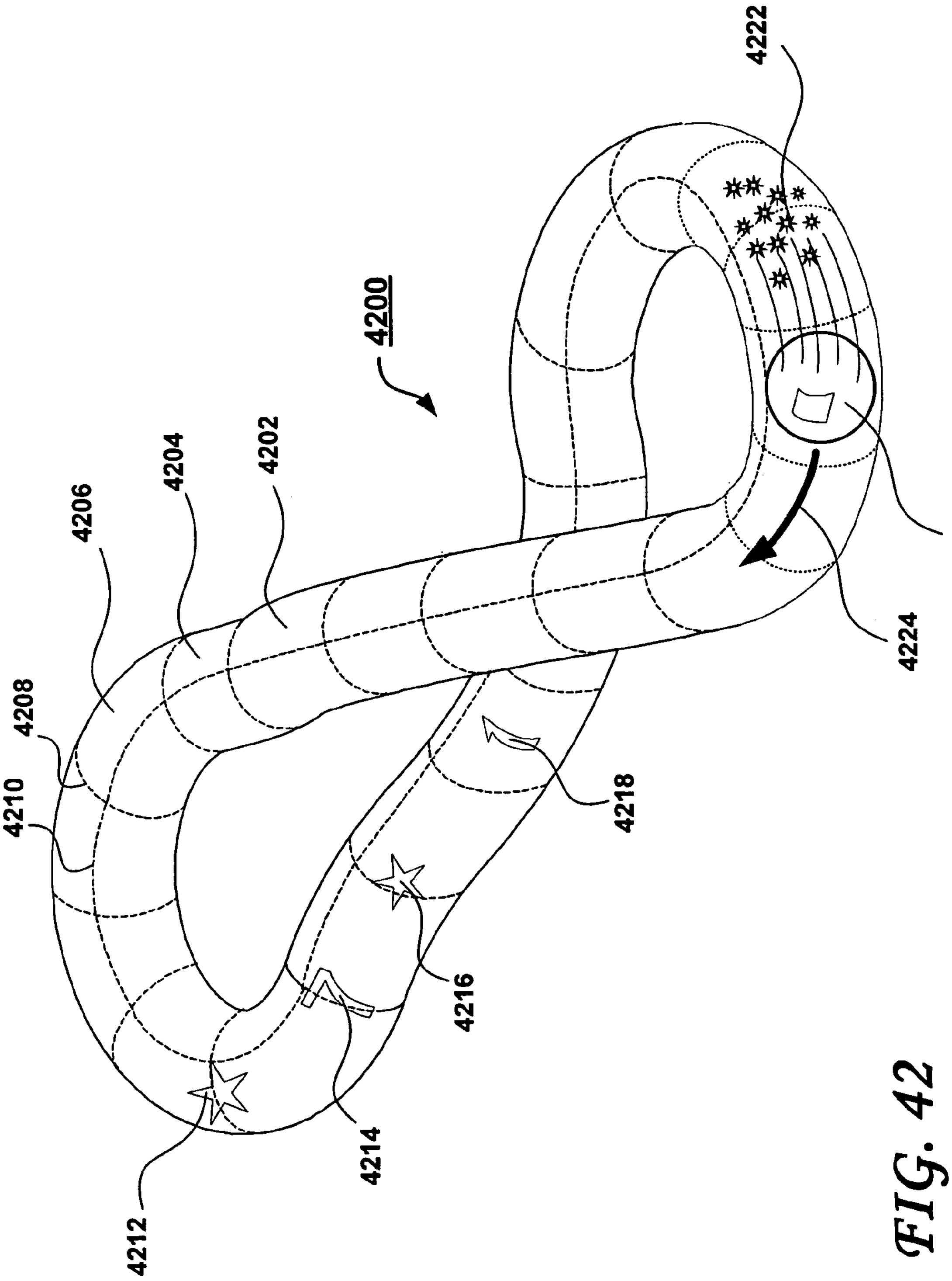
FIG. 42 illustrates an example of a 3D solid warped conduit layered with flexible LCD panels, according to an embodiment of the present invention.

The game animation on the video screen 1118 may advantageously be replaced by the embodiment of the invention depicted at FIG. 42, which shows a 3D solid warped conduit layered with continuous arcuate video panels, as described in detail hereunder.

Figure 12:
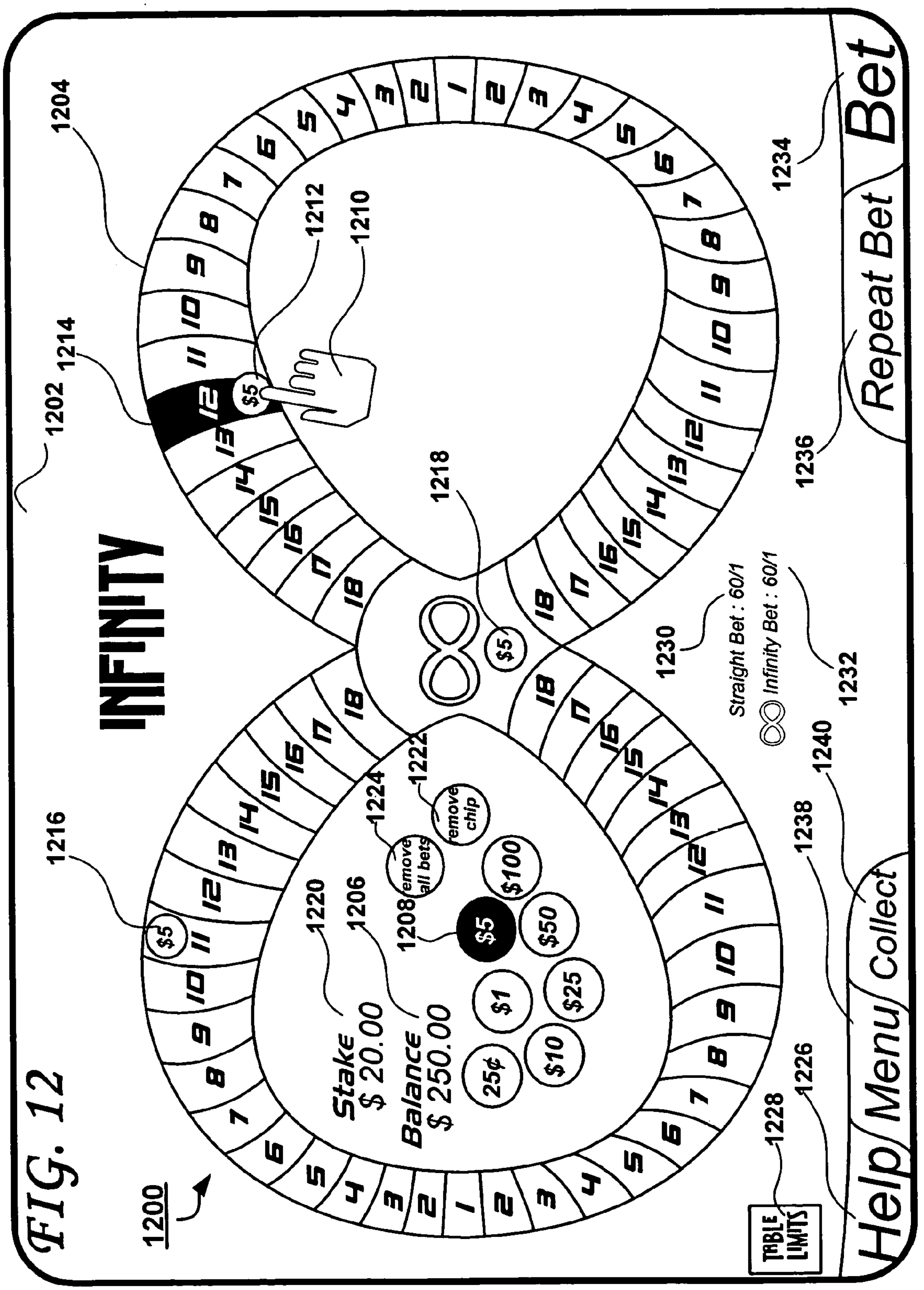
FIG. 12 shows an example of a slot machine game, according to an embodiment of the present invention.

FIG. 12 illustrates another embodiment of the invention, including a video slot machine game 1200. The infinity shaped segmented conduit 1204 is rendered on a video screen 1202, which may be equipped with a touch screen to enable player interaction.

Player credits are shown as a numerical balance 1206. Total stake (totals of bets placed for the current game) is shown at 1220. Tokens represent the monetary amount placed on a given feature. Available token amounts (25¢, $1, $5, $10, $25, $50 and $50, for example) may be rendered in the left loop of the infinity symbol. The $5 token amount 1208 is shown as being selected by a clearly visible video highlight. Subsequent to token selection, the bet for the denomination amount chosen may be placed by touching the selected location 1214 for a bet on segment labeled by the number 12. Touching again at the same location will add more bet amounts of the chosen denomination. Option 1222 and 1224 allow for removing individual chips or removing all chips, respectively. In the present Infinity game, a bet on a simple segment is called a "straight bet", which may be associated a 60/1 (for example) return, as shown at 1230.

In the embodiment shown herein, there are 71 physical segments, incorporating 18 different numbers and 1 infinity symbol, although other configurations may readily be devised and implemented. The segment at the intersection 1218 may be marked with the infinity symbol, as shown. The Infinity segment 1218 at the crossing of the two loops may be implemented in two ways: (a) as equivalent to a single segment, or (b) as equivalent to a double segment. The "double infinity" segment concept may be conveyed by visualizing the racer entering the segment from any direction (out of 2 possible directions); while the "single infinity" segment concept may be conveyed by visualizing the racer entering the segment from one predetermined direction only (from left to right for example).

The "double infinity" segment winning rule may be implemented in two ways:

(a) as equivalent to a racer stopping in 2 different segments in the same manner as the "0" and "00", of the traditional roulette (thus a payment table is established for each case), or (b) as a "bonus" across several games played, whereby the racer has stopped twice a the infinity segment, the first time in one direction, and the second time in the second direction.

Both of the scenarios described above for the racer stopping at the intersection may be expanded to the "Beyond Infinity" path shapes 108, 112, 114, 118, 124, 126, 214 shown in FIG. 1 and/or other paths featuring crossings. As the intersection or intersections location or segment may be the result of the intersection of several paths, more intricate play/bet rules may be applied with higher return prospective and bonusing amounts. Placing bets on and/or generating a bonusing scheme from the "Intersection" feature using all the characteristics described above associated with an intersection of paths and the stopping of one or a plurality of racers at the intersection are features that may be incorporated into the embodiments described and shown herein.

In the game depicted at 1200, the infinity segment is equivalent to a single segment (similar to the "0" position in a roulette game) with an associated return of 60/1, as shown at 1232. Other odds and configurations may be devised and implemented in the embodiments described herein by those of skill in this art.

The game may be started by the player by pressing the "Bet" button 1234. A bet may be repeated by pressing the "Repeat Bet" 1236 button, allowing the player to repetitively play his favorite selections multiple times. The player may access the help section by pressing the "Help" button 1226. The pay table may be accessed by pressing the "Table Limits" button 1228 (the Pay Table is detailed hereunder). The player may exit the game to play another slot game on the same machine by pressing the "Menu" button 1238. The player may terminate his gaming session and collect all his credits by pressing the "Collect Button" 1240.

Figure 13:
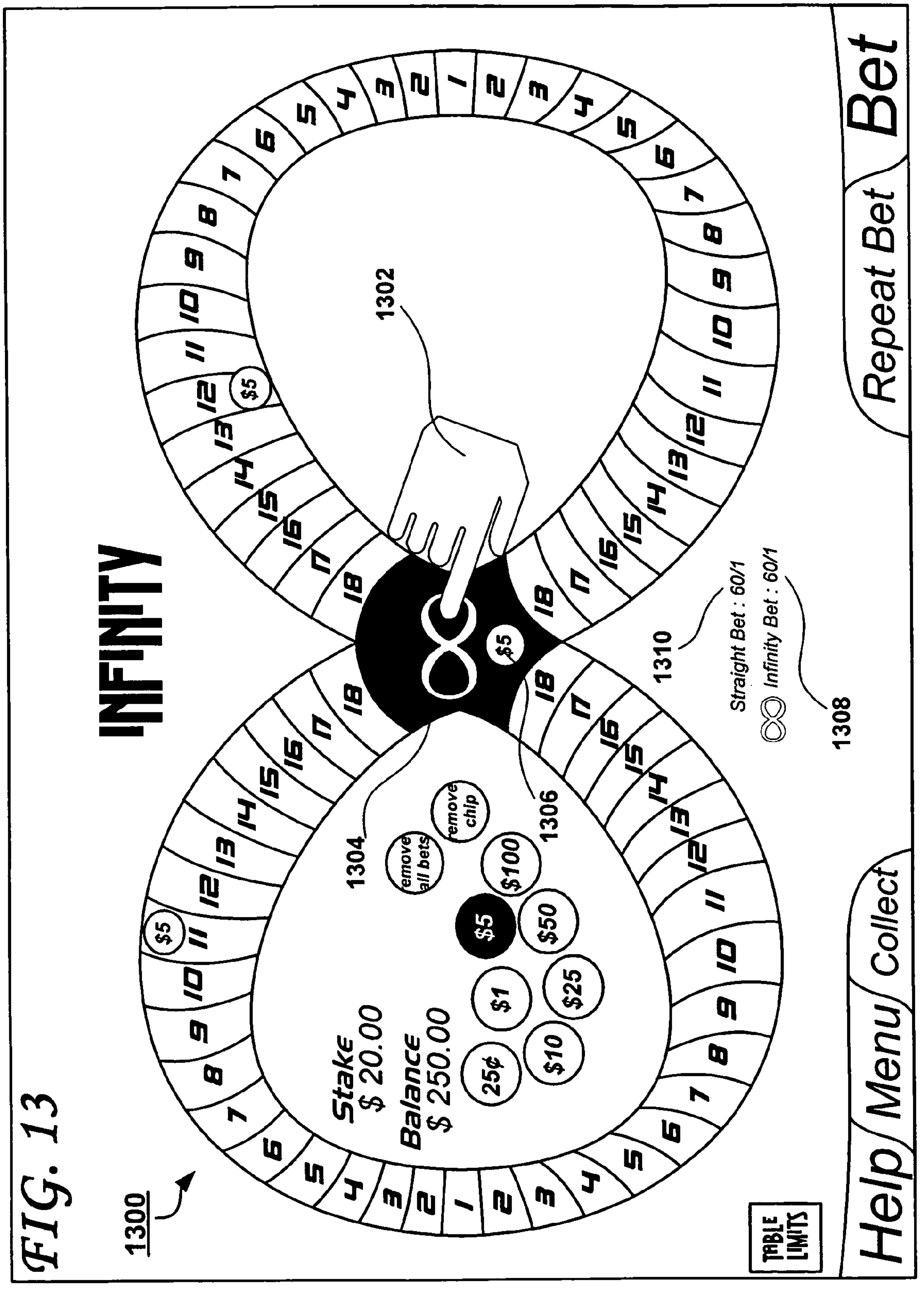
FIG. 13 shows the manner in which a bet may be placed on the Infinity feature, according to an embodiment of the present invention.

FIG. 13 illustrates the highlighting of the infinity segment 1304 when the player 1302 touches the screen to place a bet on the Infinity feature. A token 1306 may be displayed to confirm the stake amount bet on the infinity segment. The possible return may be shown at 1308 and the return for straight bets are shown at 1310. A segment is also called a feature thereafter. A feature is an identifiable object or a collection of objects that a player may choose for placing bets. Collection of objects may be a group of contiguous objects or an aggregate of objects linked by a concept such as a number, a color, a shape, an animal family (mammals, invertebrate, . . . ). Objects may be segments, shapes, symbols, color coded zones, pictures, animals, famous personages, sounds or zones representing a play concept. A given linked features or aggregate of linked features may be represented on a video screen by highlighting all the associated items.

Figure 14:
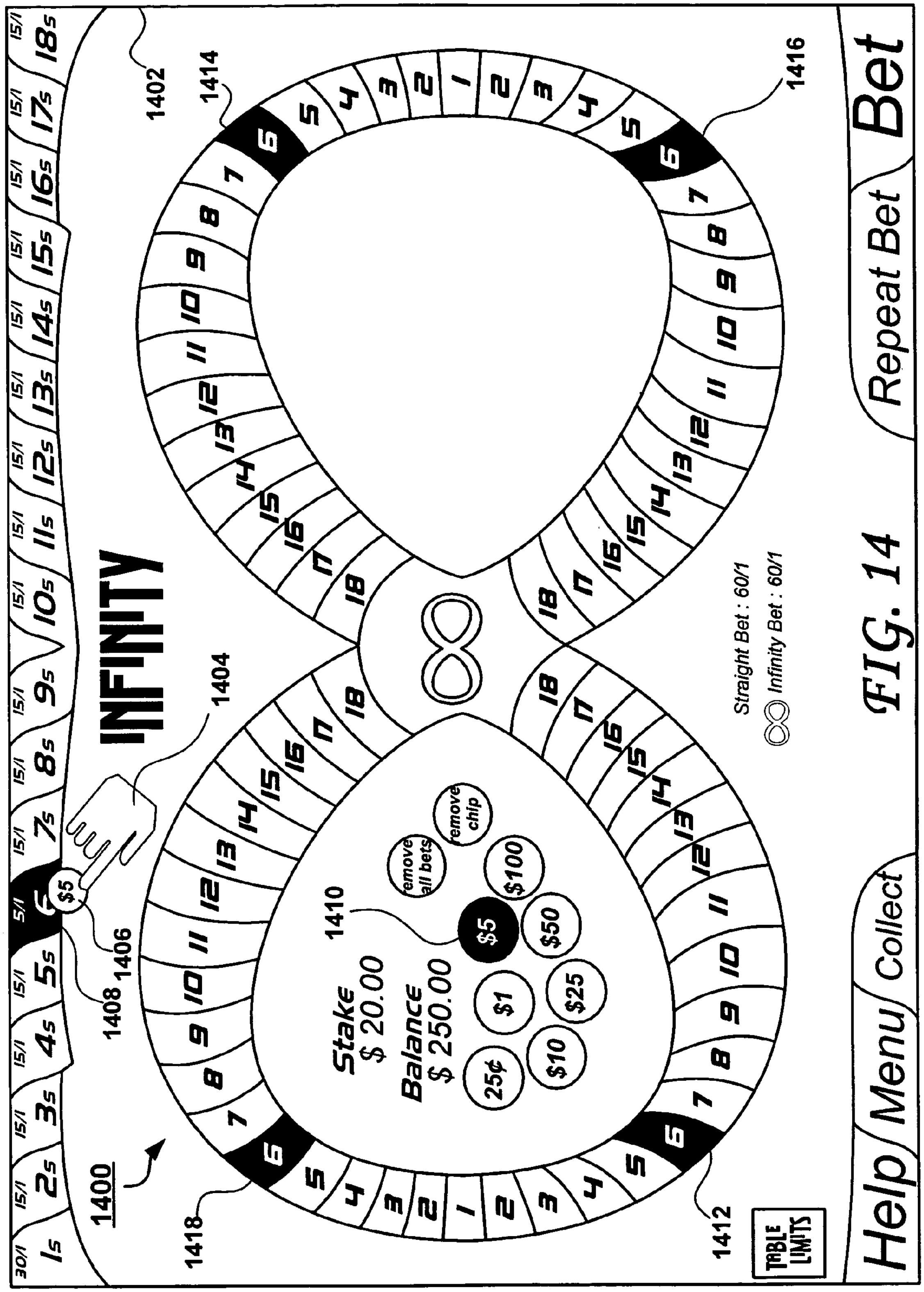
FIG. 14 shows the manner in which a bet may be placed on a Number feature, according to an embodiment of the present invention.

FIG. 14 at 1400 illustrates the manner in which a bet may be placed on the "number" feature. Along the upper edge of the screen 1402 are the "Numbers" bets. Placing a bet on one of these covers all occurrences of that number on the infinity conduit. For number 1 there are only two occurrences so betting on the number 1 pays 30 to 1 (other odds and payouts being possible). Numbers 2 to 18 have four occurrences of each number and pay out 15 to 1. For example, placing a bet on the "Number 6" by selecting the feature 1408 results in the highlighting of all the linked features 1412, 1414, 1416, and 1418 on the infinity conduit. A token 1406 corresponding to the bet in the pre-selected denomination 1410 ($5, in this case) is rendered over the feature that symbolizes the relationship for the links.

Figure 15:
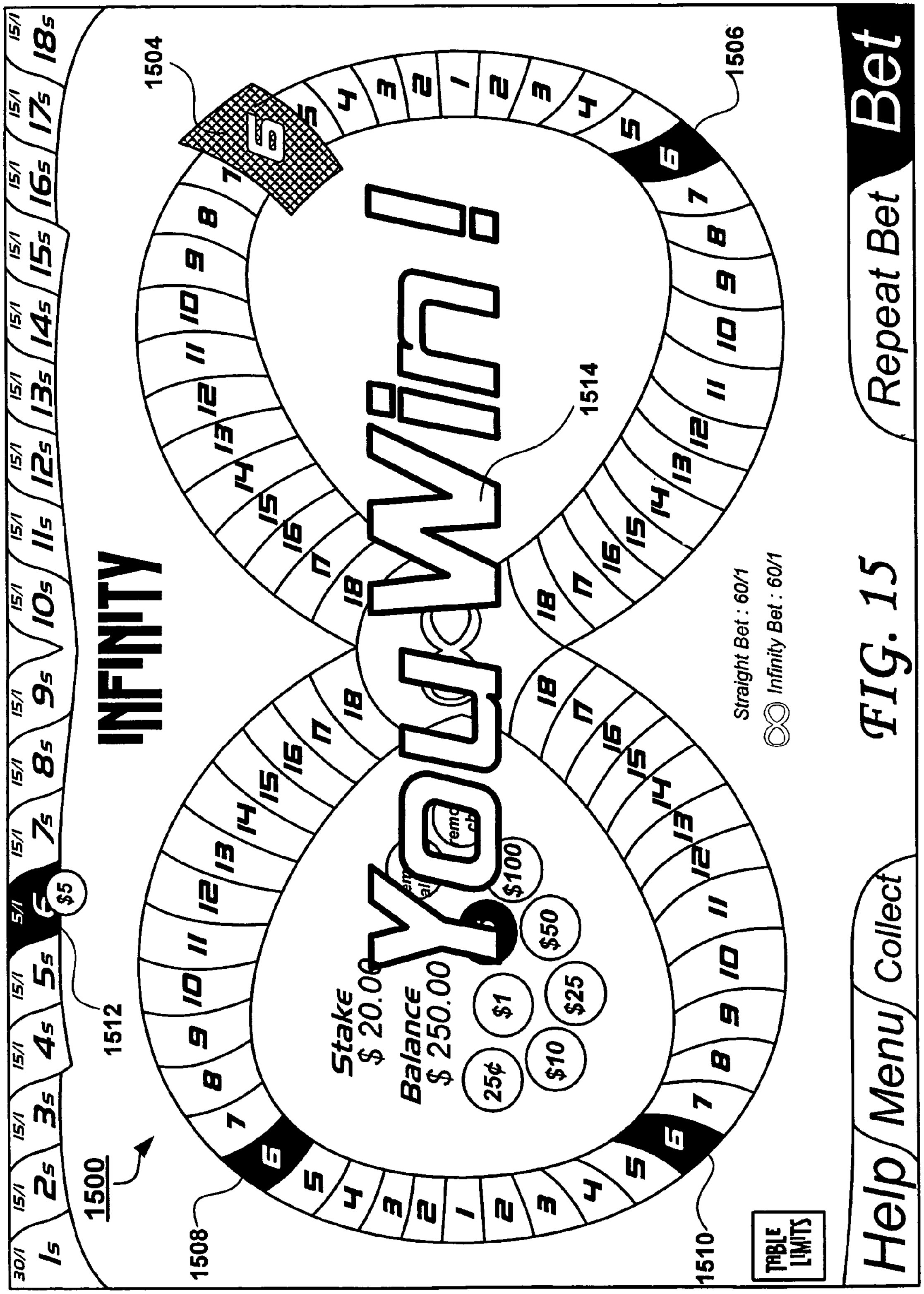
FIG. 15 shows a highlight of a winning number for a bet placed on a Number feature, according to an embodiment of the present invention.

FIG. 15 at 1500 illustrates a win on the bet placed on the Number 6 feature 1512. When the racer stops on the top-right segment 1414 (FIG. 14), the "You Win!" message 1514 and a large size highlight 1514 are shown. At the same time, all the other linked features 1506, 1508, 1510 and 1512 are highlighted.

Figure 16:
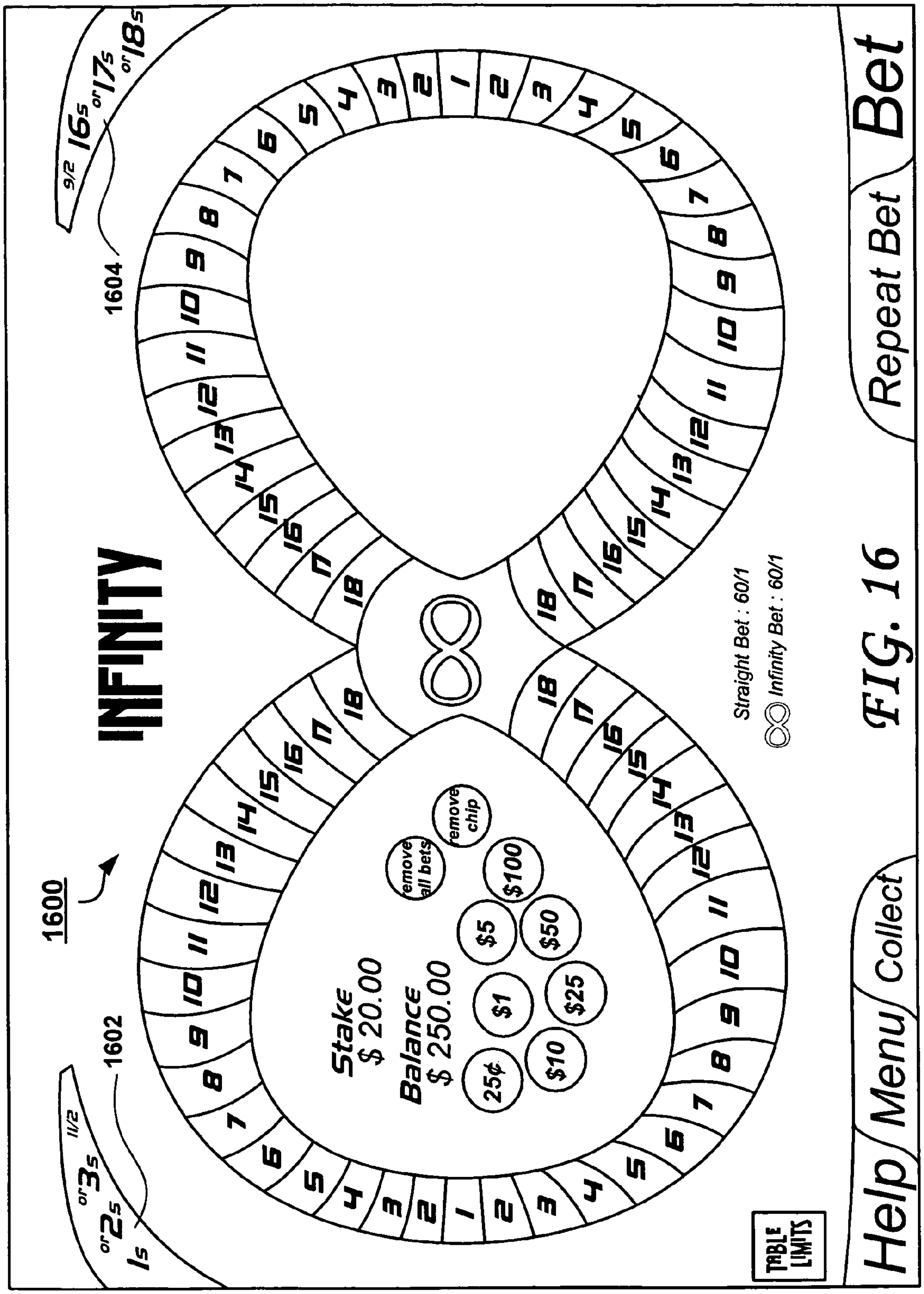
FIG. 16 shows The Top Three and Bottom Three features, according to an embodiment of the present invention.

FIG. 16 at 1600 illustrates the "Top Three" 1602 and "Bottom Three" 1604 selection feature concept allowing to place bets on the middle and side segments. Because of the location of the segments identified by these numbers, these are also referred as the "Middle Segments" and the "Side Segments" features. The "Top Three" feature 1602 covers any result of the numbers 1, 2 or 3 and pays 11/2. The "Bottom Three" feature 1604 covers any result of the numbers 16, 17 or 18 and pays 9/2.

Figure 17:
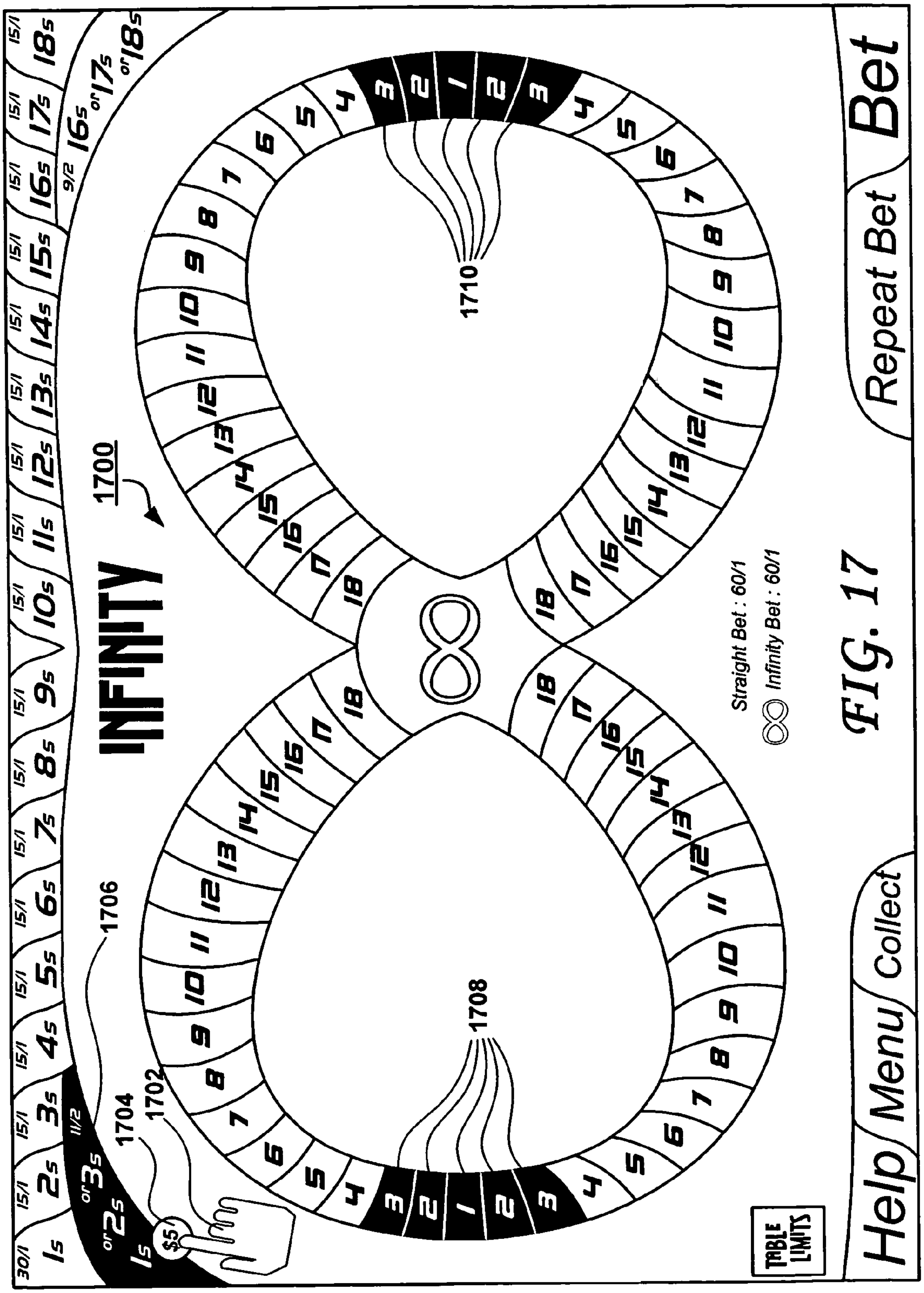
FIG. 17 shows the manner in which a bet may be placed on a Sides feature, according to an embodiment of the present invention.

FIG. 17 at 1700 illustrates the manner in which a bet may be placed on the "Top Three" feature 1706. The corresponding linked features 1708, 1710 on the infinity conduit are highlighted when placing the bet. When the player places his bet 1702, the token 1704 the player has selected to bet on the feature is shown.

Figure 18:
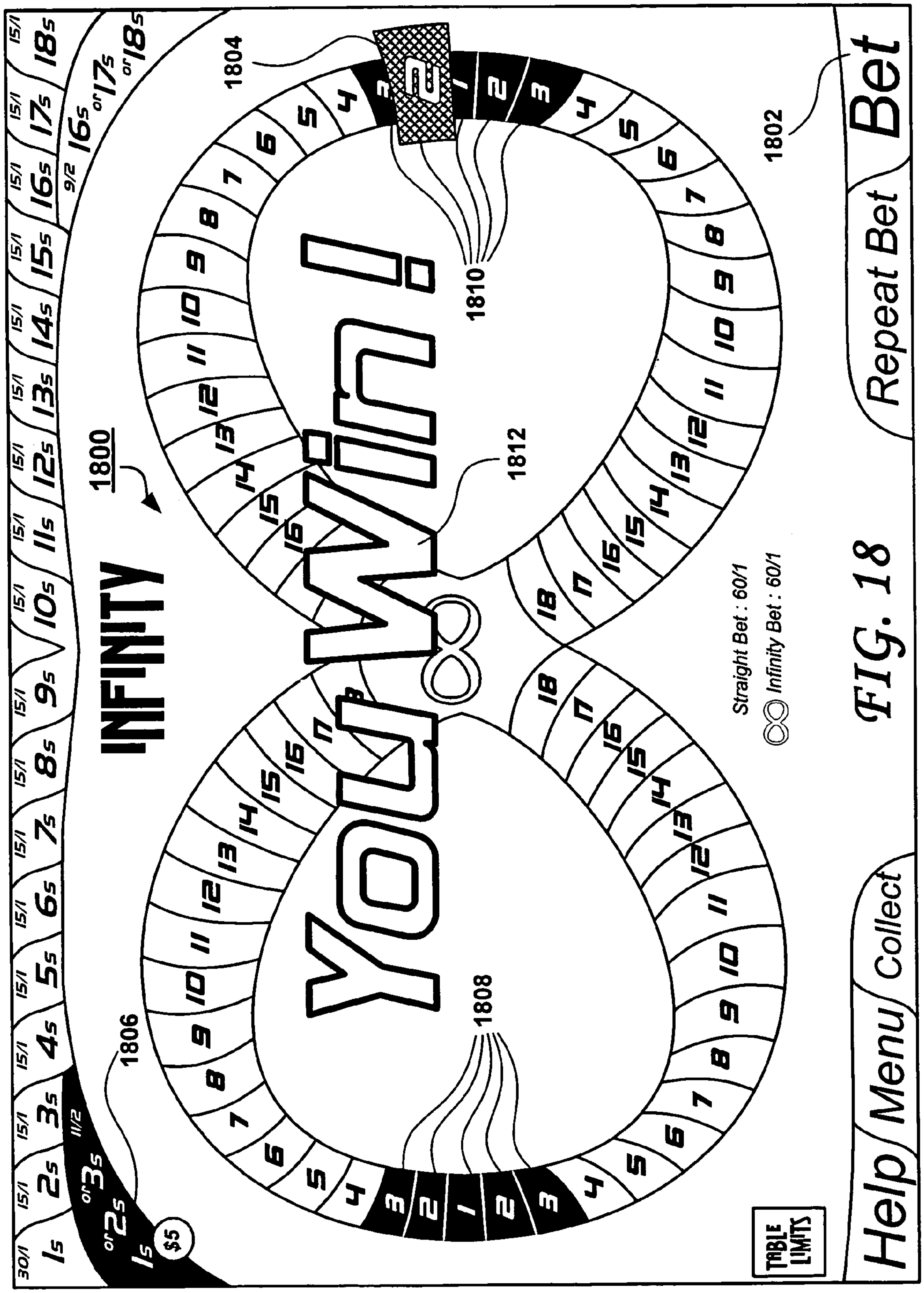
FIG. 18 shows a highlight of a winning number for a bet placed on a Sides feature, according to an embodiment of the present invention.

FIG. 18 at 1800 illustrates a win for the "Top Three" feature 1806 after the player has pressed the bet button 1802. A large size highlight 1804 is shown over the number at which the racer stopped. The corresponding linked features 1808, 1810 are highlighted when displaying the You Win! message 1812 (or equivalent message).

Figure 19:
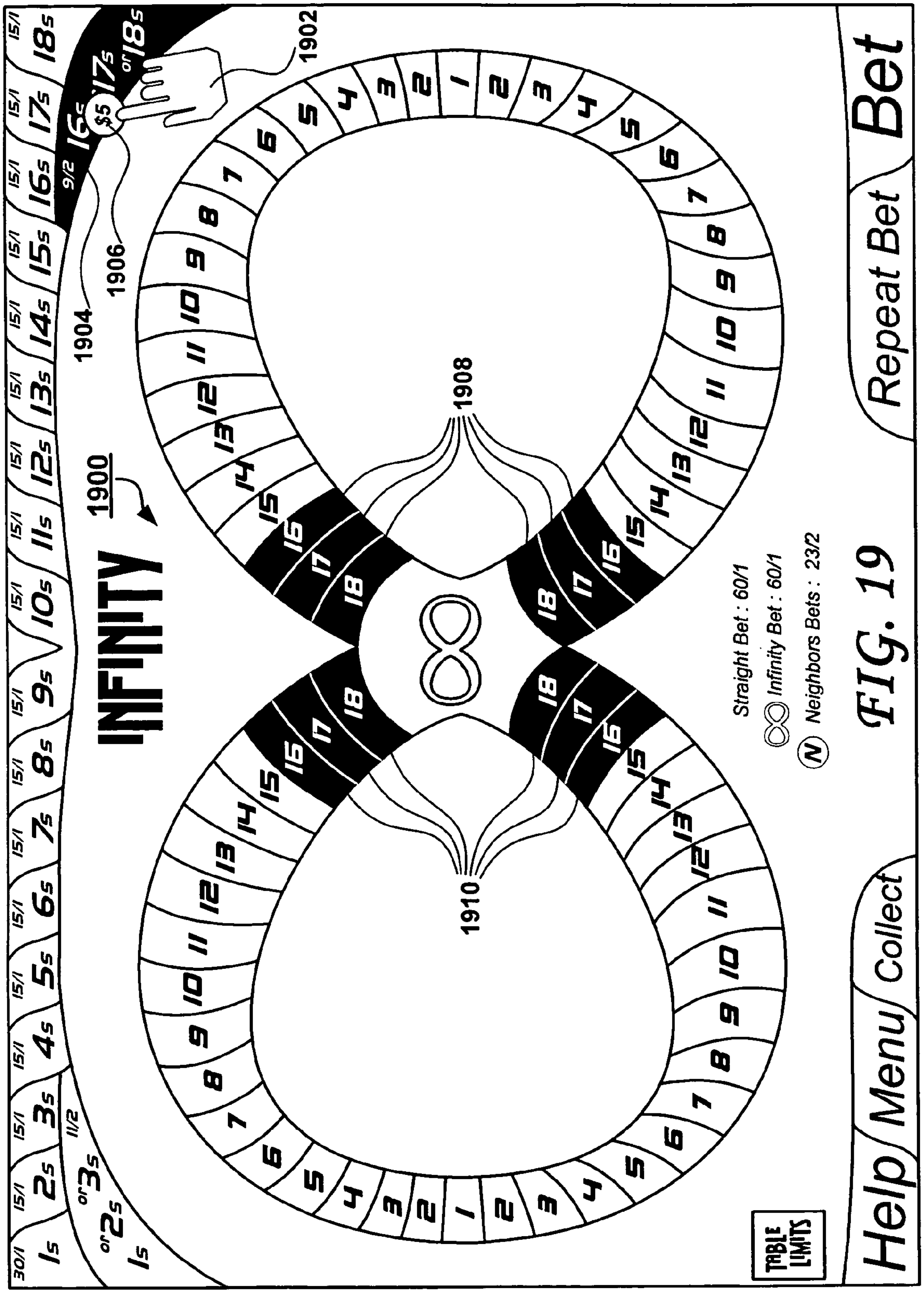
FIG. 19 shows the manner in which a bet may be placed on a Middle feature, according to an embodiment of the present invention.

FIG. 19 at 1900 illustrates placing a bet on the "Bottom Three" feature 1904. The corresponding linked features 1908, 1910 are highlighted when placing the bet. When the player places his bet as suggested at 1902, the token 1906 the player has selected to bet on the feature is shown. In the same manner, features for linking other aggregates of numbers or features (defining patterns or masks as in Bingo) or number series (odd, even, 5-10-15, . . . ) may be provided.

Figure 20:
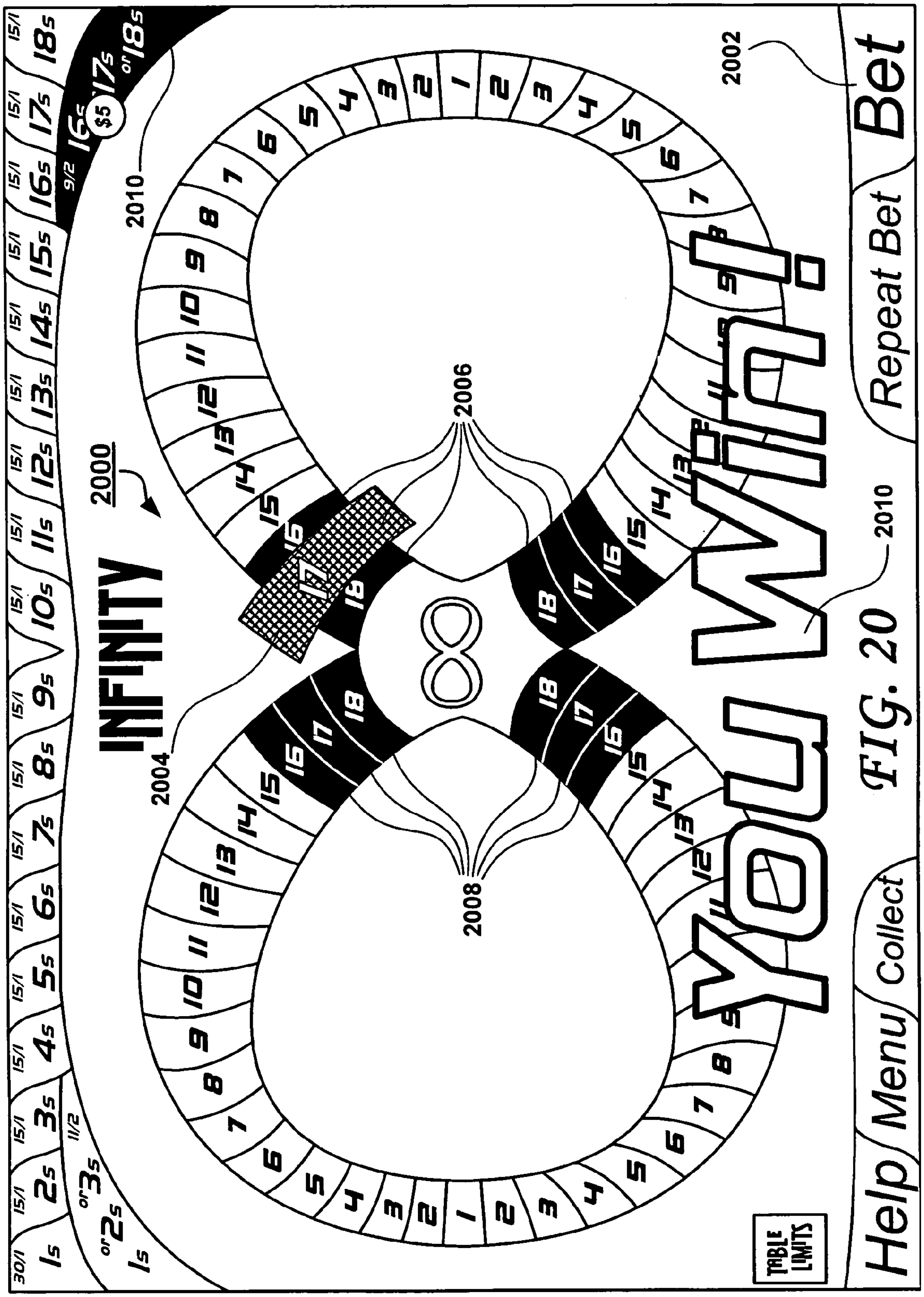
FIG. 20 shows a highlight of a winning number for a bet placed on a Middle feature, according to an embodiment of the present invention.

FIG. 20 at 2000 illustrates a win for the "Bottom Three Numbers" feature 2010 after the player has pressed the bet button 2002. A large size highlight 2004 is shown at the number at which the racer stopped. The linked features 2008, 2010 are highlighted when displaying the You Win! message 2010 (or equivalent message).

Figure 21:
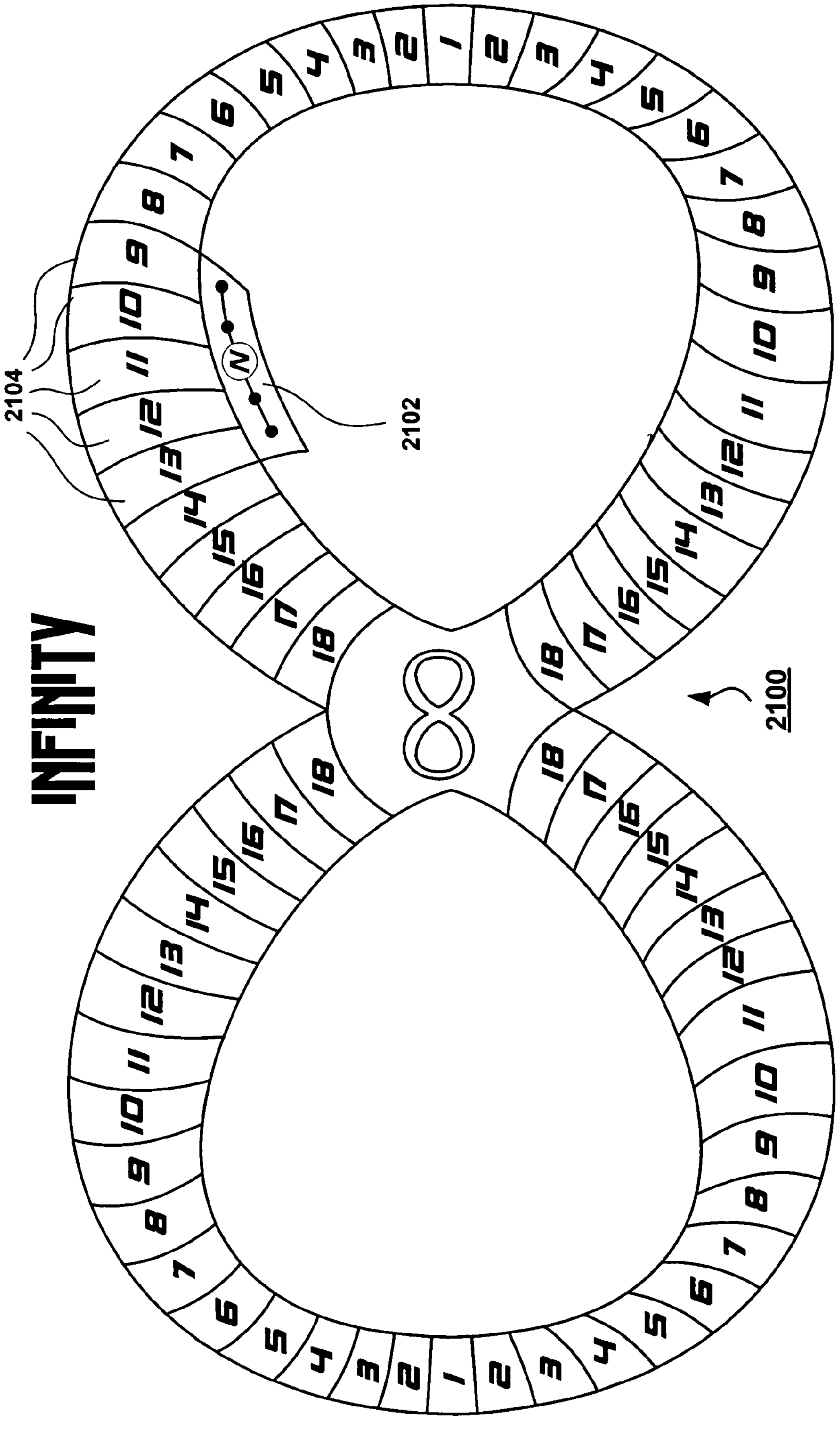
FIG. 21 shows the Neighbors feature, according to an embodiment of the present invention.

FIG. 21 at 2100 illustrates the "Neighbors" feature. A visual aid 2102 for selecting a group of 5 neighboring numbers 2104 is depicted. As shown, adjacent to the track on the inner part of the track loops are the Neighbors bet segments 2102 identified by the letter 'N'. Placing a bet on one of these covers the five consecutive numbers 2104 to which the "Neighbors" feature is attached. Neighbors bets pay out 23 to 2 (other payouts being possible). The only track segment not included in a 'Neighbors' is the infinity symbol in the center of the track.

Figure 22:
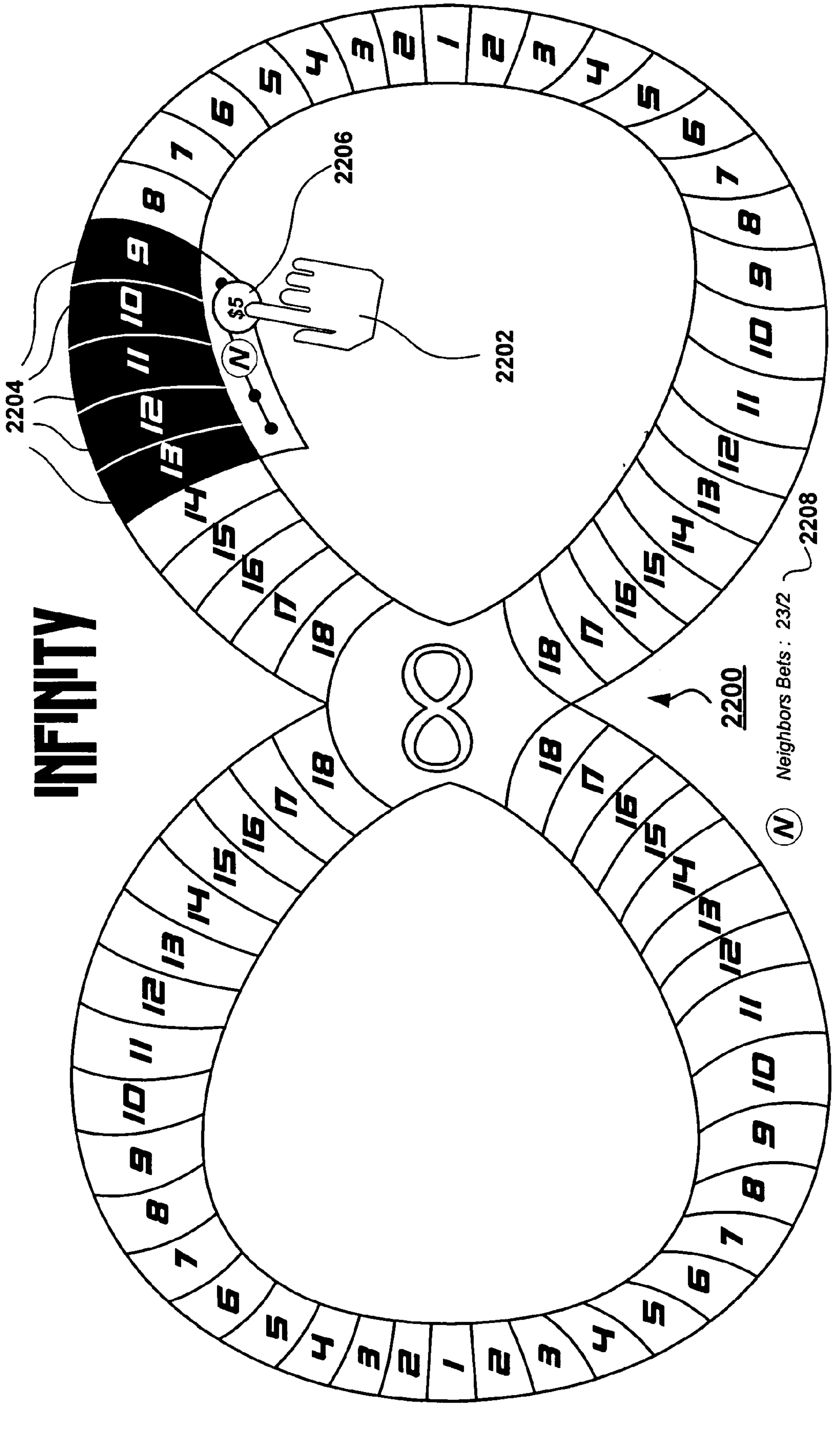
FIG. 22 shows the manner in which a bet may be placed on a Neighbors feature, according to an embodiment of the present invention.

FIG. 22 at 2200 illustrates placing a bet on the "Neighbors" feature. The objects linked to the "Neighbors" feature 2102 (FIG. 21) are the five numbers 9, 10, 11, 12 and 13 as shown at 2204) located on the upper right quadrant of the Infinity track. When the player places his bet as suggested at 2202 on the feature 2101, the numbers 2204 are highlighted and the token 2206 the user has selected to bet on the feature is shown. The return for the Neighbors feature is 23/2, as shown at 2208 (other payoffs being possible).

Figure 23:
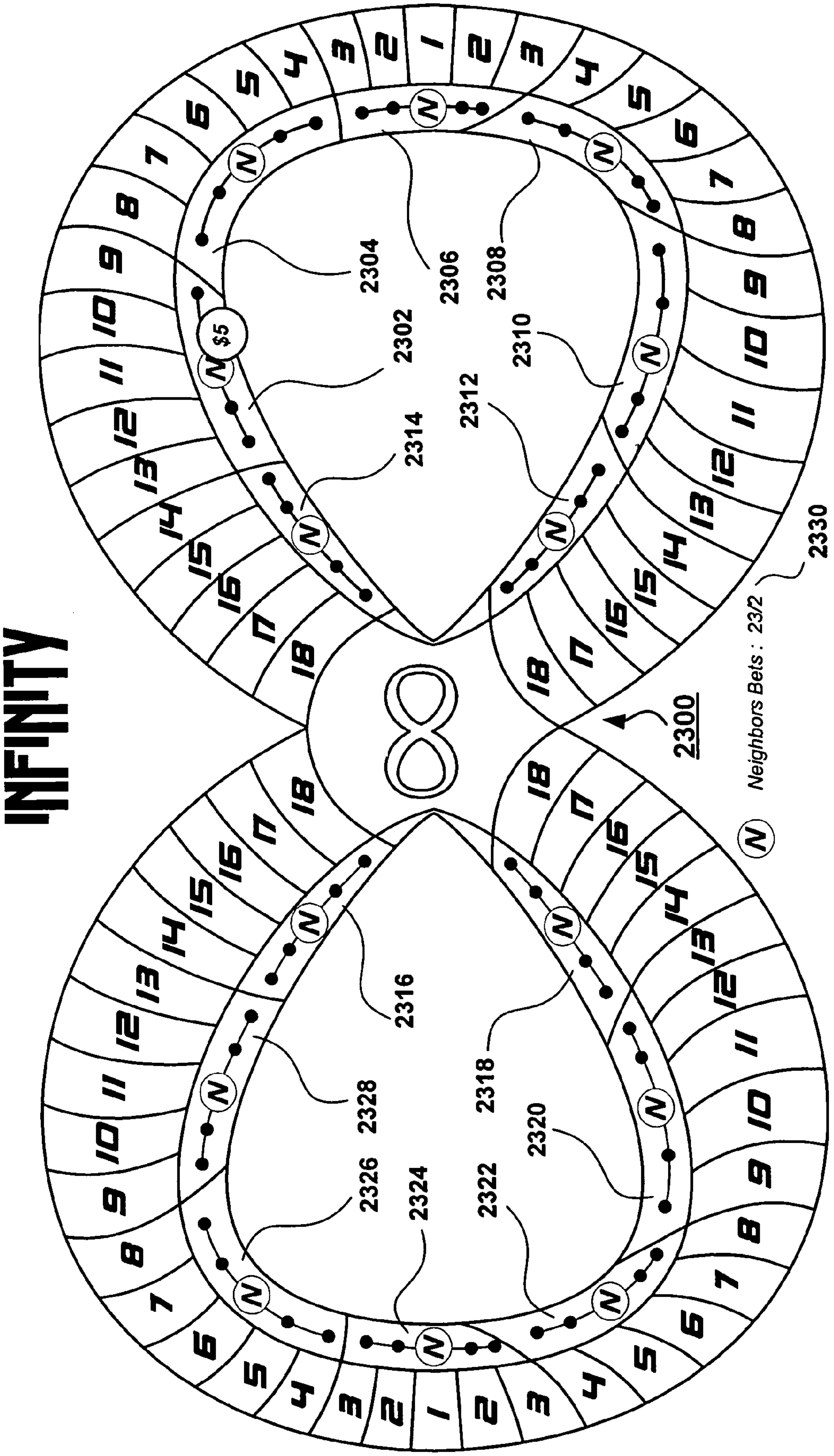
FIG. 23 illustrates the allocation of "Neighbors" features all around the infinity conduit or track, according to an embodiment of the present invention.

FIG. 23 at 2300 illustrates one possible distribution of "Neighbors" features all around the infinity conduit or track. As shown, adjacent to the track on the inner part of the track loops are disposed the Neighbors bet segments or features 2302, 2304, 2306, 2308, 2310, 2312, 2314, 2316, 2318, 2320, 2322, 2324, 2326 and 2328. For user convenience, the Neighbors features are identified by the letter 'N'. The return for each of the Neighbors features is 23/2, as shown at 2330.

Figure 24:
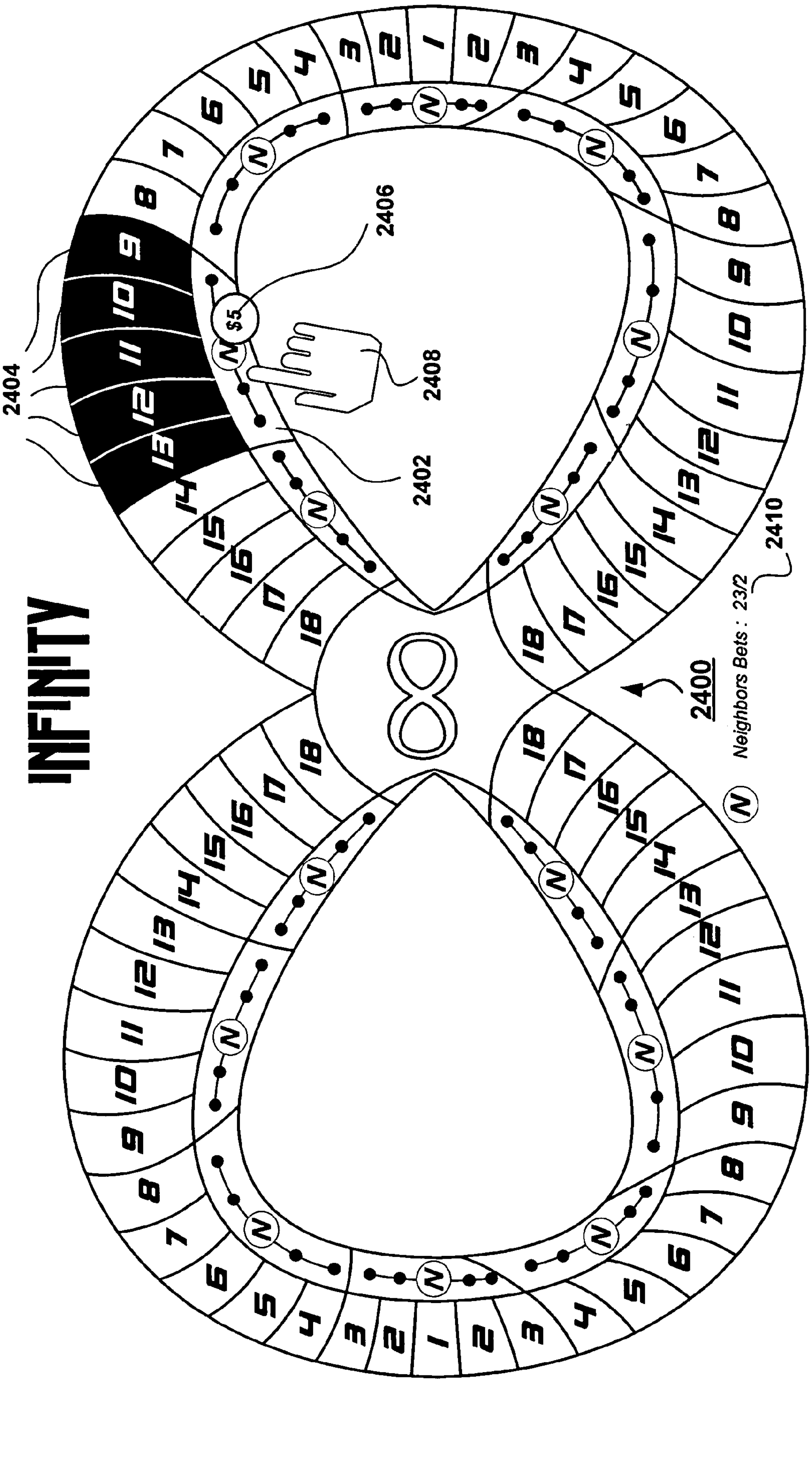
FIG. 24 illustrates placing a bet on a Neighbors feature while all the other Neighbors features are displayed, according to an embodiment of the present invention

FIG. 24 at 2400 illustrates the manner in which a bet may be placed on a Neighbors feature while all the other Neighbors features are displayed. The objects linked to the Neighbors feature 2402 are the five numbers 9, 10, 11, 12 and 13 as indicated at 2204 that are located on the upper right quadrant of the Infinity track. When the player places his bet as suggested at 2408 on the feature 2402, the numbers 2404 are highlighted and the token 2406 that the player has selected to bet on the feature is shown. The return for the Neighbors feature may be, for example, 23/2 as indicated at 2410.

Figure 25:
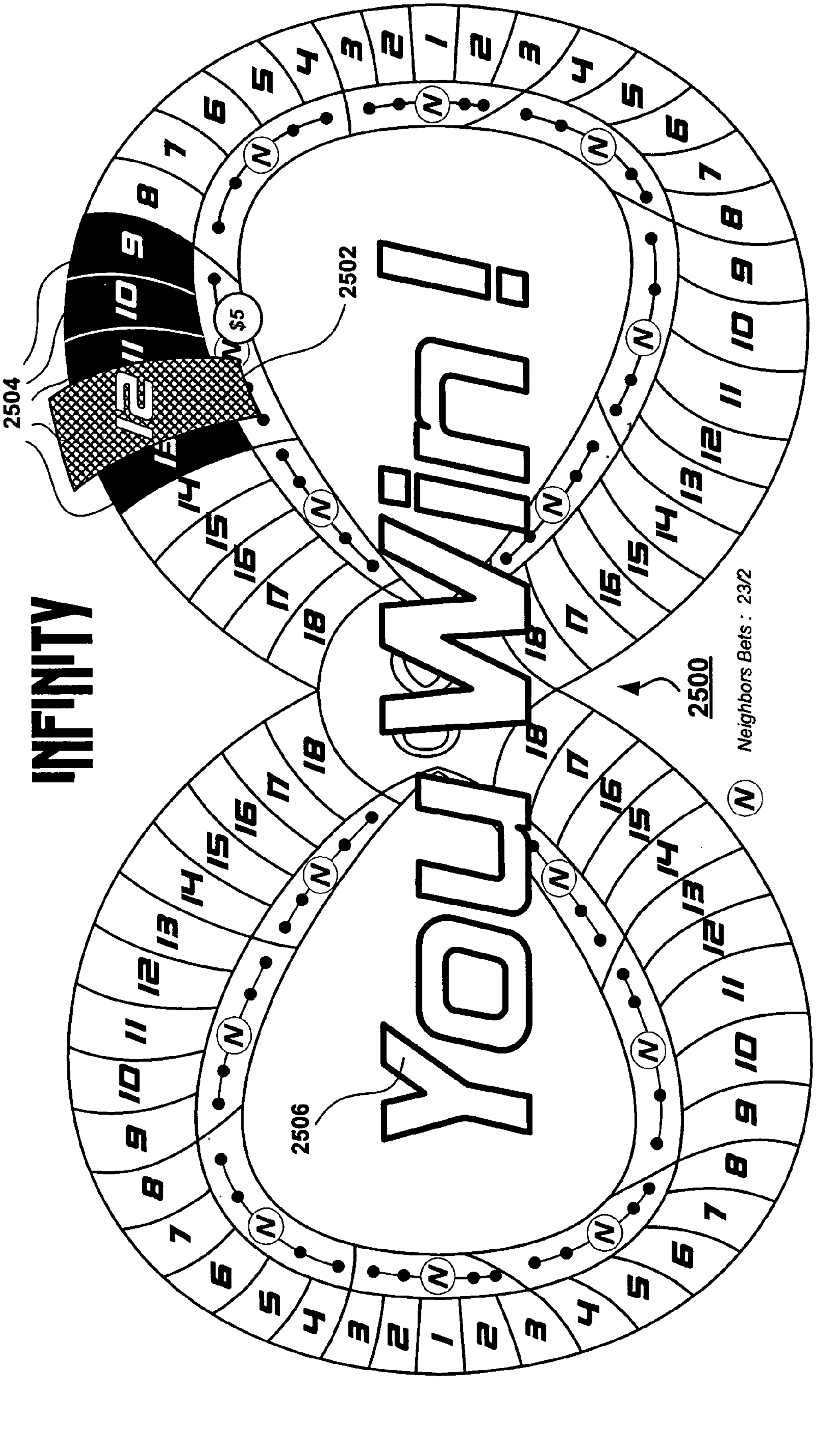
FIG. 25 shows the highlight of a winning number for a bet placed on a Neighbors feature, according to an embodiment of the present invention

FIG. 25 at 2500 illustrates a win for the selected Neighbors feature. A large size highlight 2502 is shown at the number 12 where the racer stopped. The linked numbers 2504 are highlighted when displaying the You Win! or equivalent message 2506.

Figure 26:
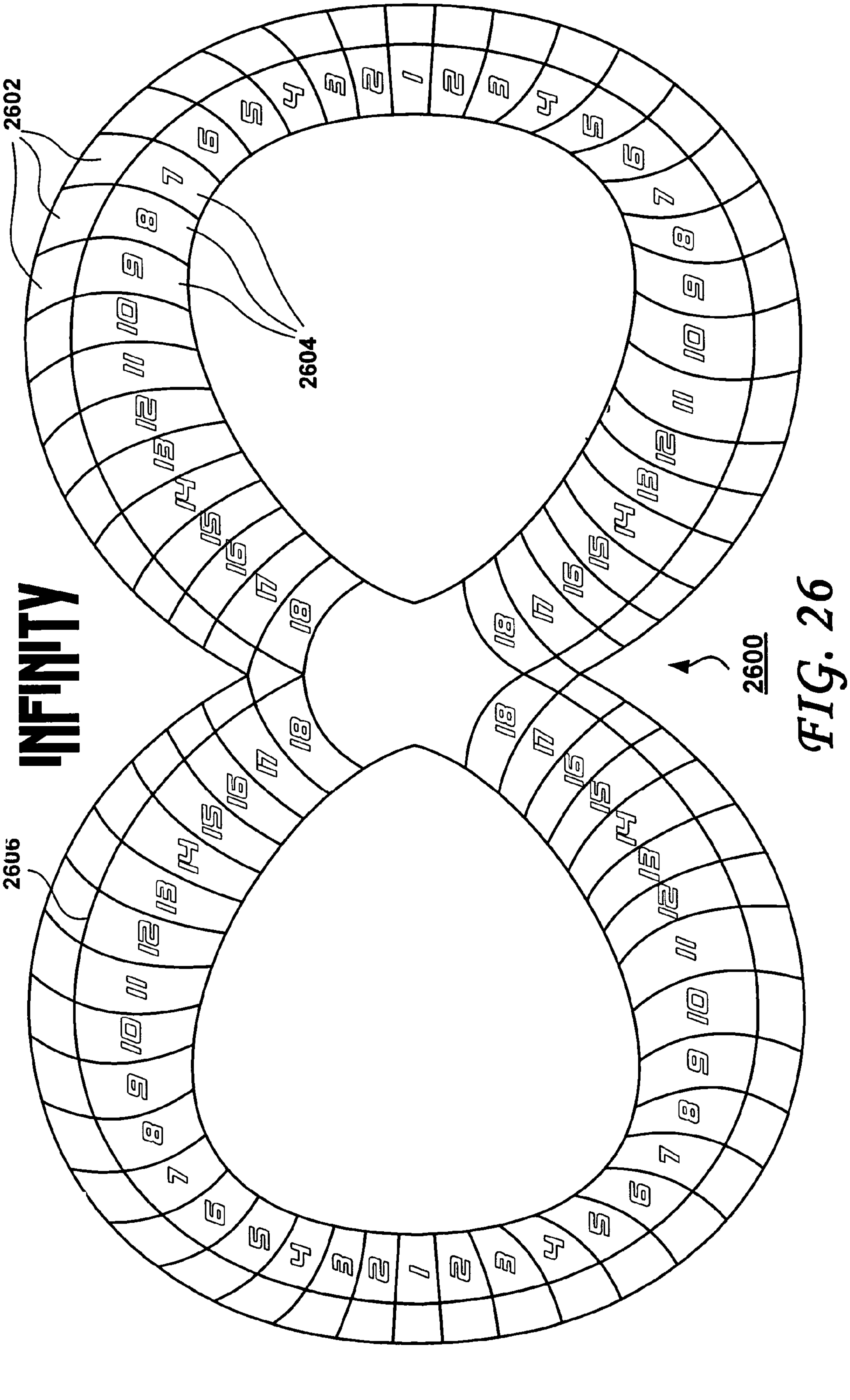
FIG. 26 shows the Infinity conduit additional segmented outer track, according to an embodiment of the present invention

FIG. 26 at reference numeral 2600 illustrates the principle for providing a segmented track, according to an embodiment of the present invention. Segments as shown in FIG. 5 and FIG. 6 may be further divided by adding an adjacent line 2606 such as each segment (except the middle segment) is dividend in 2 segments. In the illustration FIG. 26, the three segments 2604 for numbers 7, 8 and 9 are divided to produce three additional segments 2602.

Figure 27:
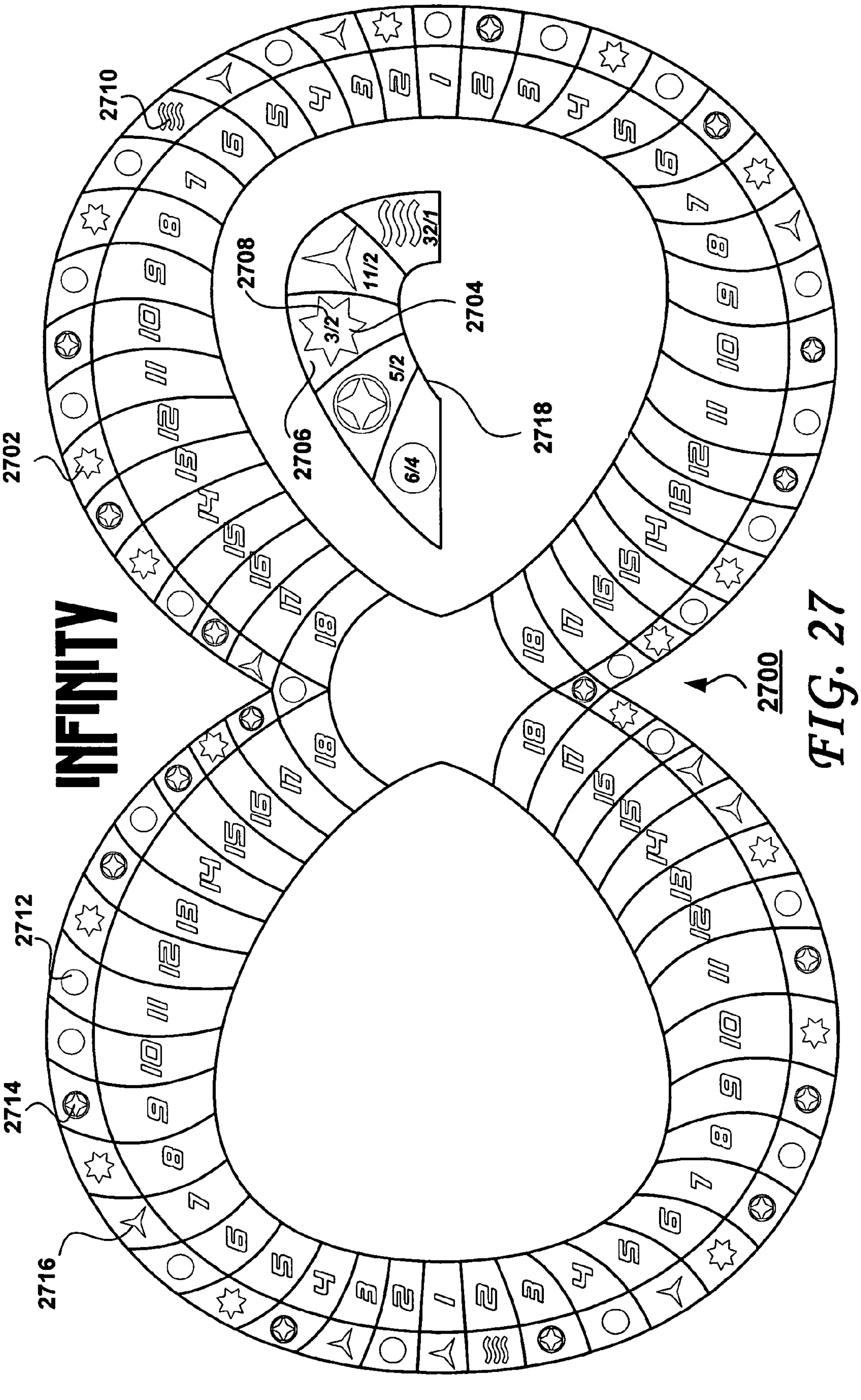
FIG. 27 shows segmented outer track populated with the Shape feature, according to an embodiment of the present invention

FIG. 27 at 2700 illustrates the concept of populating the outer segmented track with visual objects, according to an embodiment of the present invention. Shapes such as a 3-pointed star 2716, a 4-pointed star 2714, 7-pointed star 2702, a circle 2712 and a wavy symbol 2710 are shown in this example. All shapes available on the outer track are linked in a selection zone 2718. For example, all the 7-pointed star shapes (2702, 2730, 2732, 2734, 2736, 2738, 2740, 2742, 2744, 2748, 2750, 2752, 2754, 2756, 275,8 2760 and 2762) are linked to the 7-pointed star feature 2704 that has a 3/2 return, as shown at 2708.

Figure 28:
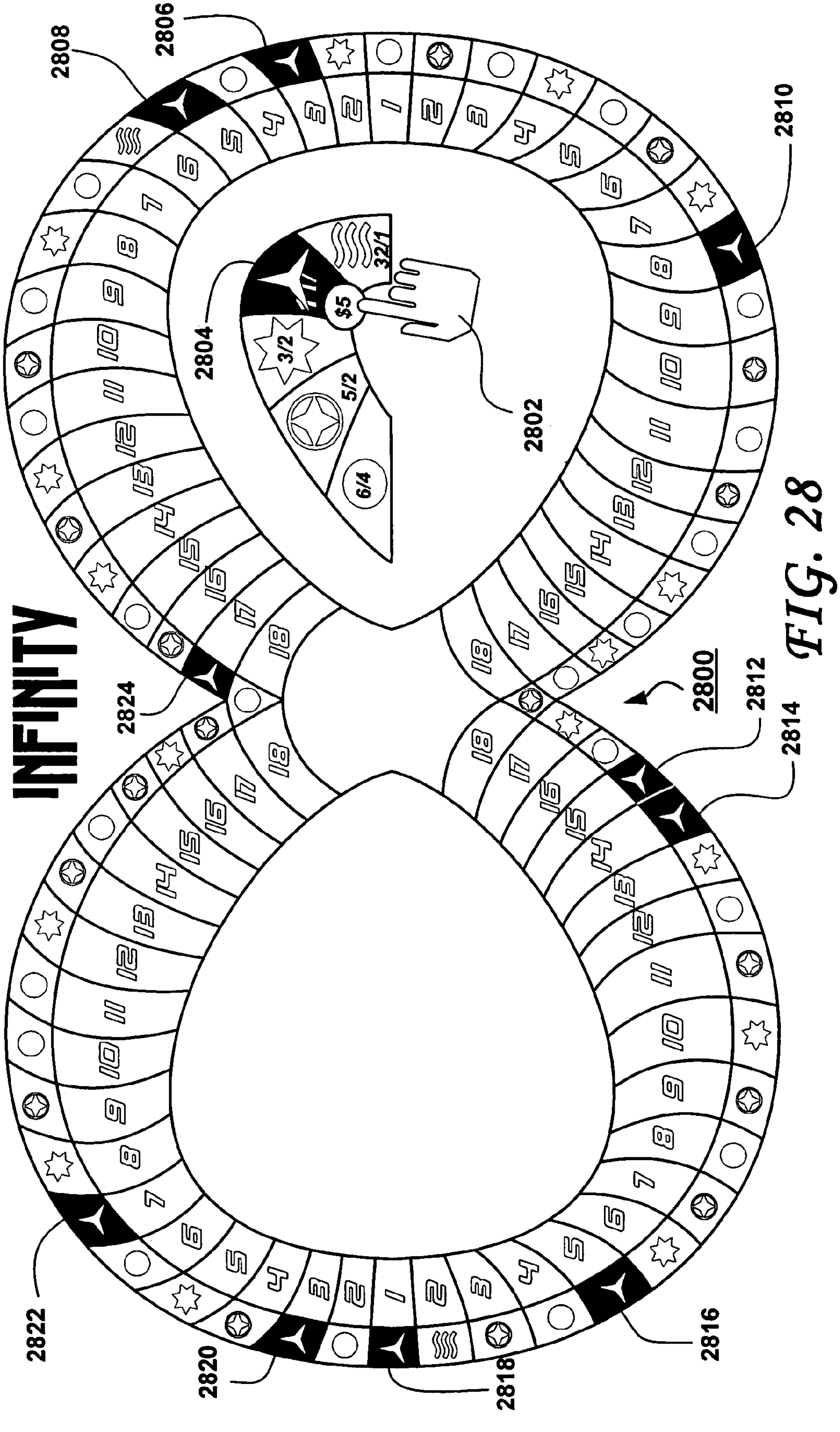
FIG. 28 shows the manner in which a bet may be placed on a Shape feature, according to an embodiment of the present invention

FIG. 28 at 2800 illustrates the placing of a bet on a "Shape" feature. In this example, the player 2802 touches the "3-pointed star" shape in the selection zone 2804. This causes all of the linked "3-pointed star" symbols 2806, 2808, 2810, 2812, 2814, 2816, 2818, 2820, 2822 and 2824 to become highlighted.

Figure 29:
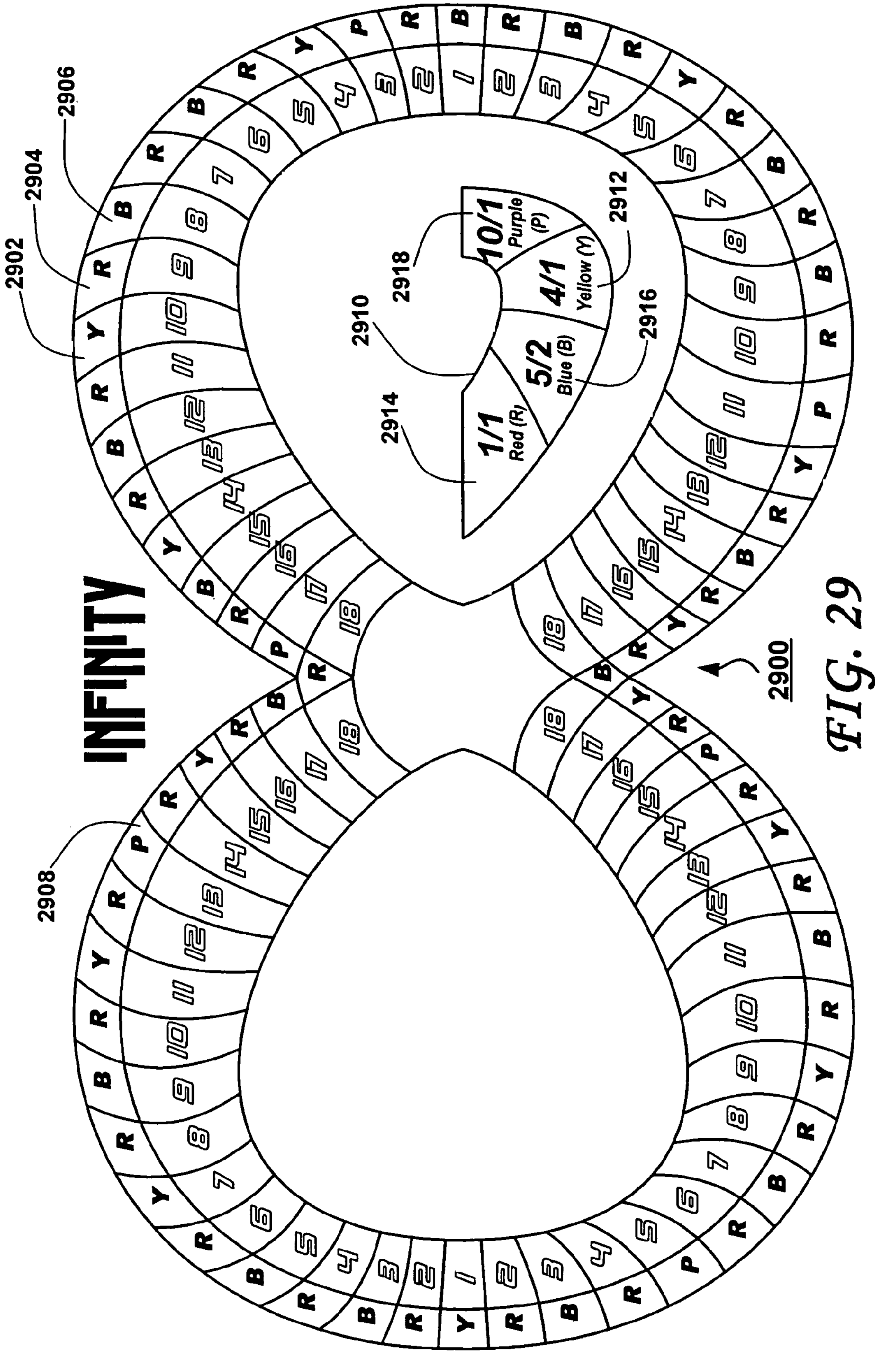
FIG. 29 shows a segmented outer track populated with the Color feature, according to an embodiment of the present invention

FIG. 29 at reference numeral 2900 illustrates the concept of populating the outer track with the "color" feature, according to an embodiment of the present invention. Instead of shapes as shown in FIG. 27, the outer segmented track may be populated with colors (represented letters by the letter Y at 2902 for yellow, the letter R at 2904 for red, the letter B at 2906 for blue and the letter P 2908 for purple. The colors are distributed along the outer-segmented track in the same manner as the shapes described relative to FIG. 27. Each colored segment is linked to a color feature in a selection zone 2910. In this example, the RED feature 2914 has a 1/1 return, the BLUE feature has a 5/2 return, the YELLOW feature has a 4/1 return and the PURPLE feature has a 10/1 return, it being understood that other color distributions (and hence odds and payouts) are possible.

Figure 30:
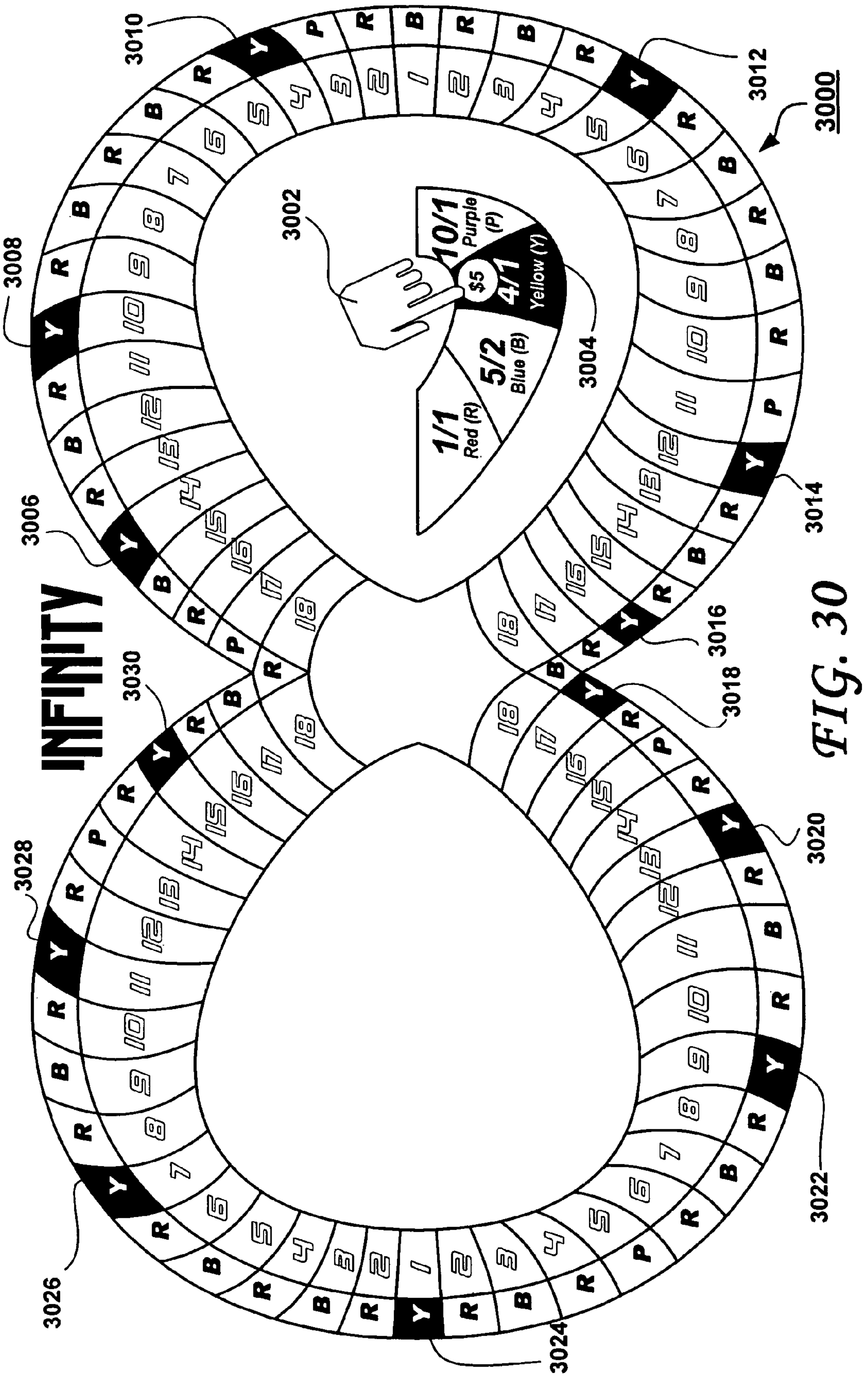
FIG. 30 shows the manner in which a bet may be placed on a Color feature, according to an embodiment of the present invention.

FIG. 30 at 3000 illustrates the placing of a on a "color" feature. In this example, the player 3002 touches the YELLOW feature in the selection zone 3004, which causes all of the linked YELLOW colors in the segmented outer track 3006, 3008, 3010, 3012, 3014, 3016, 3018, 3020, 3022, 3024, 3026, 3028 and 3030 to be highlighted.

Figure 31:
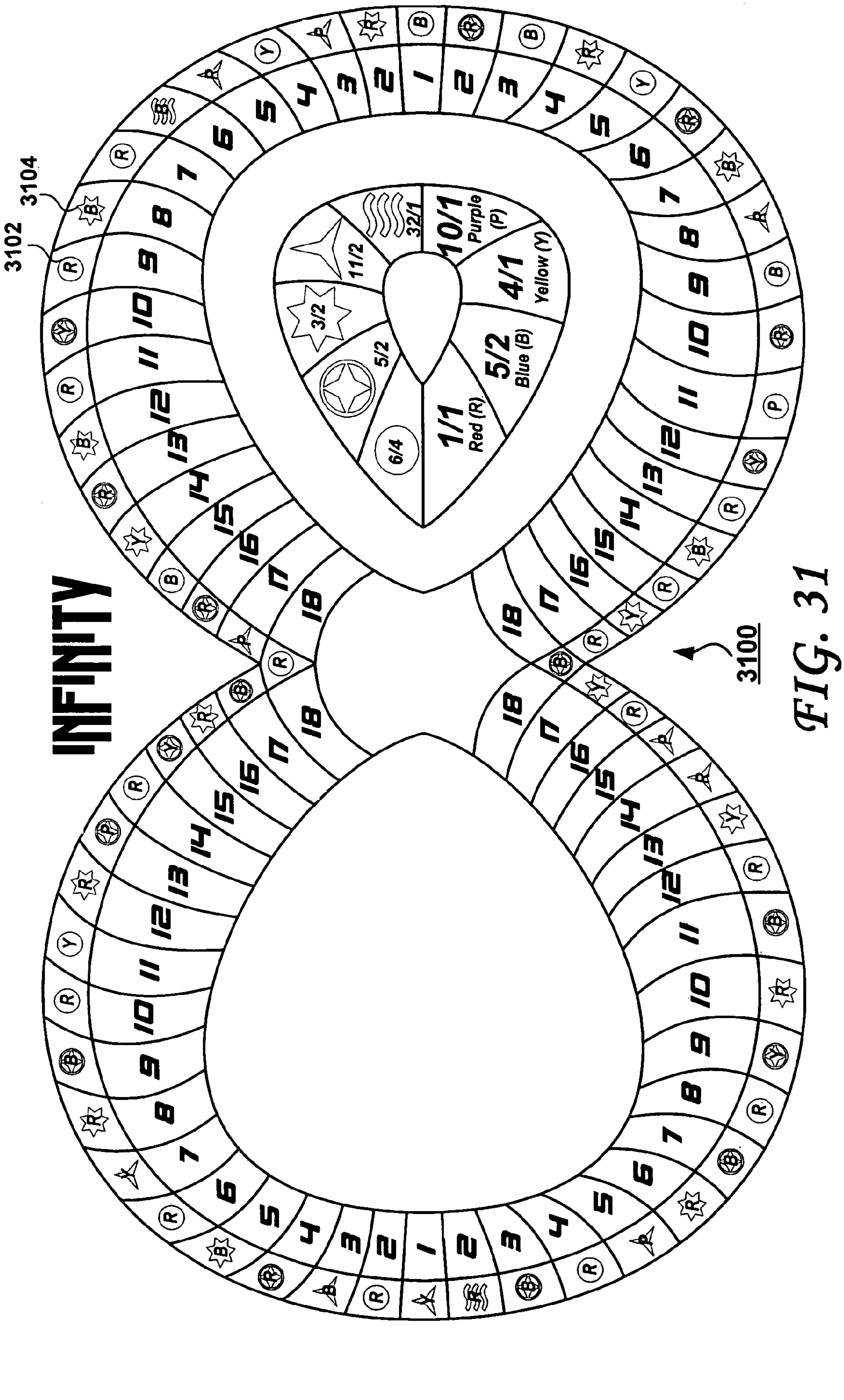
FIG. 31 shows a segmented outer track populated with the Colored Symbol features, according to an embodiment of the present invention.

FIG. 31 at 3100 illustrates the concept of combining the shape feature and the color feature, according to an embodiment of the present invention. In the illustration, the color feature is provided by the color of the shape. For example, numeral 3102 is a red circle, and numeral 3104 is a blue 7-pointed star.

Figure 32:
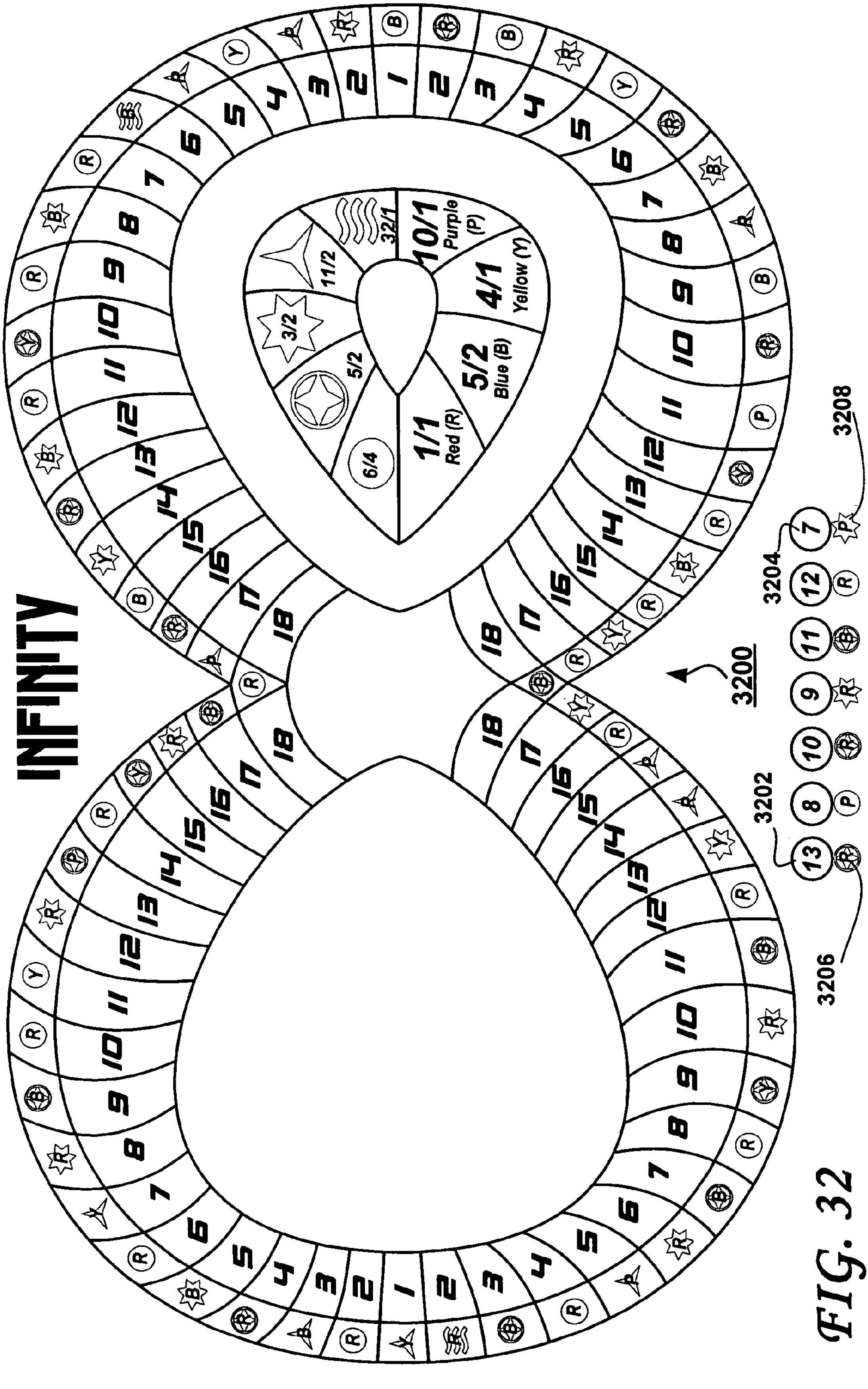
FIG. 32 shows the last drawn Numbers/Symbols/Colors Zone, according to an embodiment of the present invention.

FIG. 32 at 3200 illustrates the indicator of the last seven number/shape/color combinations drawn. The most recent number drawn 3204 and shape/color combination 3208 are on the right side. The oldest number drawn 3202 and oldest shape/color combination 3206 are on the left side. It is to be understood that other configurations are possible within the context of the present invention.

Figure 33:
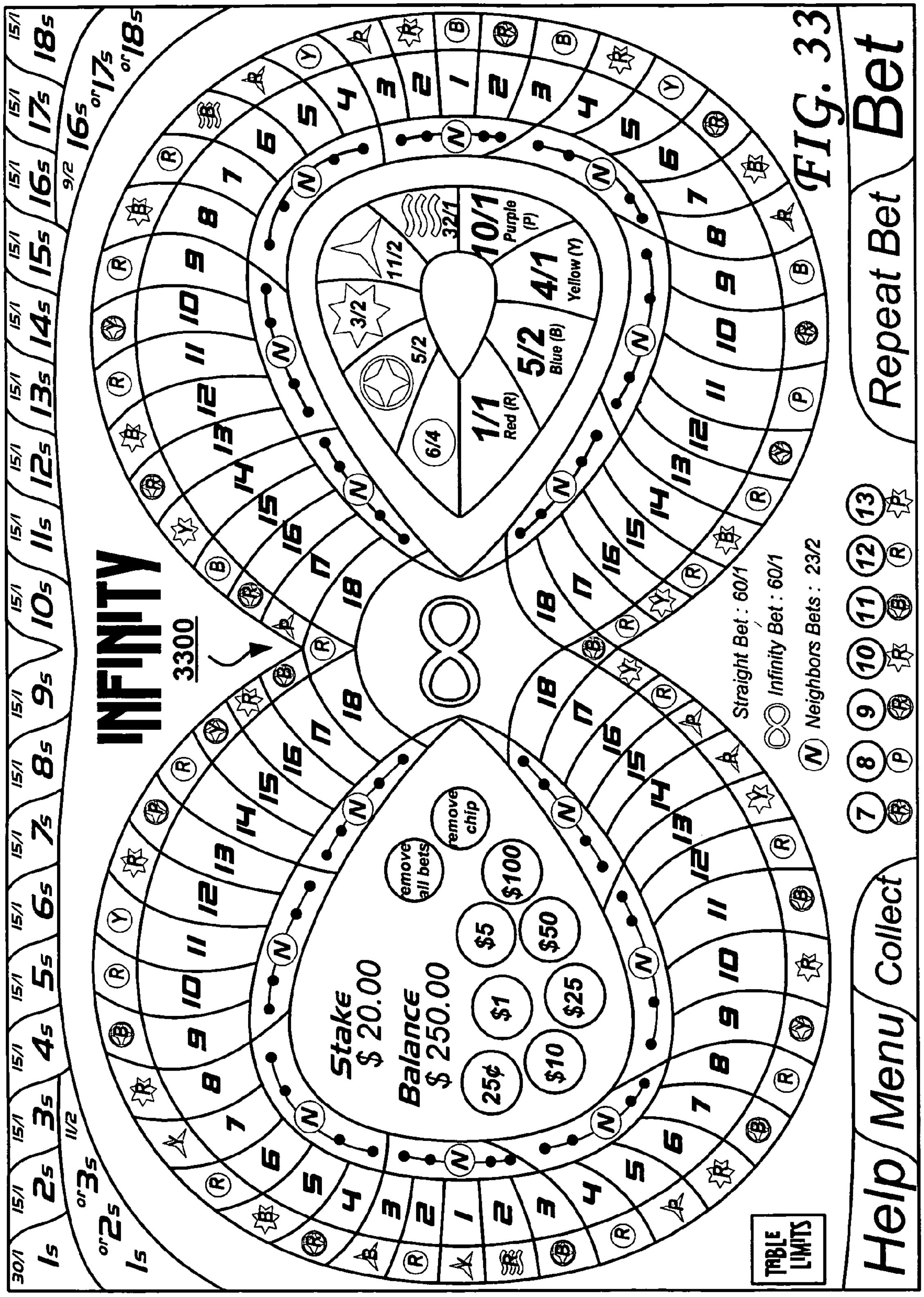
FIG. 33 shows an exemplary layout of the Infinity game with all the features shown, according to an embodiment of the present invention.

FIG. 33 at 3300 shows a layout of an embodiment of the Infinity game with all the features shown. This embodiment may be implemented as a slot-machine video game called "Infinity" that integrates all the linked attributes or features described above. Infinity is a game of chance that offers multiple betting opportunities. The game may include segments arranged on a surface in the shape of the infinity symbol ∞. One of the segments in the circuit may be chosen by a random event, preferably using a random number generator, which may form the basis for all bets. Each segment may have a number of attributes including, for example a number, a color, a shape, a symbol, a special video effect and/or a sound. Segment attributes may be grouped or linked by an association criterion called a "feature". Bets may be placed on each of these attributes individually or in a predetermined combination thereof (also referenced as a feature). The player may place a combination of several simultaneous bets and receive wins based on matching any or all attributes of the winning segment or features.

In the embodiment of the Infinity game illustrated at FIG. 33, there are 71 physical segments, incorporating 18 different numbers, 4 colors, 5 shapes, and 1 infinity symbol. The segment at the intersection is marked with the infinity symbol, and has no other attribute. Each of the other segments has a single color, shape and number. Some numbers occur twice, others four times. Other arrangements are possible.

The draw may be made from a random number generator and the result may be presented as an animation around the circuit. Each segment of the central track lights up in turn, accelerating, running lap after lap of the circuit, then decelerating until the light stops on a single segment. The animation motion effect is also called the "racer" in the description above and as illustrated in FIG. 7 and FIG. 8.

Two exemplary approaches for rendering the stopping of the racer may be adopted. The first involves picking one of the segments at random, reducing the speed of the animation until the light stops on the selected segment. The other involves beginning the deceleration process at some random point; with the outcome being decided when the light comes to a halt. Other approaches for rendering the stopping of the racer may occur to those of skill in this art.

The racer has an equal likelihood of stopping on each segment, meaning that are 71 possible outcomes. The odds are based on the natural probabilities of the events occurring in a draw from these 71 outcomes. The return to player and hit frequency are all based on the odds assigned to the various bets. There are several variants on the probability matrix. Changing the number of segments affects the margin and hit frequency. Furthermore, the logical probability of the intersecting point may be used to modify the margin. For example, the first mechanism for selecting the winning segment described above presents 71 logical segments, each with equal probability of occurring. The other mechanism above has 72 logical segments, with the intersection having twice as much probability of occurring as the others.

Increasing the number of possible outcomes allows for more attractive odds. In some variations, the margin varies from bet to bet. There are bets that have a margin of less than 3%, while those same bets on a different machine may have a 5% margin. The frequency of each attribute is used to control the margin.

The intersecting segment may be used as a trigger an additional gaming feature. In an embodiment, the game may have multiple animated racers (such as described at FIG. 37), and multiple intersection points (as found in 2D beyond infinity symbols). The number of attributes may also change. Increasing the number of intersecting points increases the number of bet variations on offer. Increasing the number of animated racers, and consequently the number of winning outcomes, will change the pay table and may be used to increase or reduce the margin. This will also affect the hit frequency of the game.

Introducing multiple animating lights racers also introduces the mechanism for winning a progressive jackpot or other linked bonus (for example, if all lights racers stop on the same segment). Further multiple draws may be provided by having multiple instances of the circuit of segments (as described at FIG. 34), each with one or more animated racer.

The Infinity slot-machine game may be played on a single video screen fitted with a touch screen. A number of elements are shown on the screen as illustrated on FIG. 33. The track, the betting areas, the Balance & Stake amounts, “HELP”, “MENU”, “Table Limits”, “COLLECT”, “REPEAT BET” and “BET” Buttons may be displayed, among other possibilities.

The track, which dominates the center of the screen, may be green in color (for example) and shaped like a classic infinity symbol. The track may be made up of 71 individual segments. A bet chip may be placed directly on any one of these segments. A bet of this type covers one segment only and may pay out 60 to 1. The central “Infinity” segment also may pay out 60 to 1 for this type of straight bet.

Additional or alternative bets may be placed on a number of other areas on the screen, and these additional and alternative bets are described hereafter. When placing a bet, holding the finger down on a “feature” (as illustrated at FIG. 14 17 19 22 24 28 30) activates the “Betsense™ mechanism that highlights on-screen all the segments or portions of the segments having the feature’s linked attributes and allows placing a bet on that feature by positioning bet token on that area.

Within the inner blank space of the infinity symbol right loop are located the “Shape” and “Color” betting areas for the shape feature and the color feature. Bets placed on these features correspond to the colored shapes around the outer part of the track. If, for example, a bet on “yellow” color is placed, then all the yellow shapes are covered by the bet. Likewise, a bet on a shape covers all occurrences of that shape.

Adjacent to the track on the inner part of the track loops are the Neighbors bet segments. These may be rendered in blue and identified by the letter ‘N’. Placing a bet on one of these covers the five (for example) consecutive numbers to which the Neighbors segment is attached. Neighbors bets pay out 23 to 2. The only track segment not included in a ‘Neighbor’ is the infinity symbol in the center of the track.

Numbers bets may be disposed along the upper edge of the screen. Placing a bet on one of these numbers covers all occurrences of that number. There are only two occurrences of the number 1, so a bet placed on the number 1 pays 30 to 1. Numbers 2 to 18 occur four times along the infinity track, and pay out 15 to 1.

In the upper corners of the screen next to the “Number” bets are the ‘Bottom Three’ or ‘Top Three’ numbers bets. These may be deep purple in color. At the top left of the screen is the ‘Bottom Three’, which covers any result of the numbers 1, 2 or 3 and pays 11/2. At top right of the screen is the ‘Top Three’, which covers any result of the numbers 16, 17 or 18 and pays 9/2.

In the Infinity slot-machine video implementation of the game described herein, the chips that a player may select to place his bet may be located in the left ‘loop’ of the Infinity track. Touching one of these chips makes that chip value ‘active’. This may be indicated (for example) by a rotating yellow highlight. All chips placed on the betting areas will be of the selected value until an alternative chip is selected or another button is pressed. The chips shown are of a value up to the maximum chip value the player is allowed to place for the available balance. There may be seven chip values from 25¢ up to $100, for example. Other denominations are possible, as are other currencies.

All interaction and activity may take place on a single screen where a player may both place bets and watch the result. The objective is for the player to predict where an illuminated highlight that races around the track will stop. If the player correctly predicts the stopping point by placing a bet that covers that position, a return will be paid. The player may place single or multiple bets on the track itself or on a number of other betting areas on the screen. The size of the return depends on what bets have been placed on the screen. Each betting area type has different odds associated with it and these are marked on the screen. By touching the help button, the ‘Payment Table’ in displayed showing what odds/returns are available.

After selecting the chip, the player may touch any betting area on the screen to place bets of that amount. The amount of bet on that area is shown on top of the chip placed. If the player touches the same area again the amount of that bet is increased and this is indicated on top of the chip. As the bet is increased on one betting area, the chip placed may also change color to reflect the amount placed.

In the center of the bottom of the screen an indicator shows the last ten number/shape/color combinations drawn. The most recent drawn is on the left side. Pressing the ‘Table Limits’ button on the lower left of the screen results in a pop-up ‘Table Limits’ box in the screen center. This shows all the maximum bet values allowed per bet type. During or after placing the chips, the player has the option to remove all his bets currently placed or remove the bet placed on a particular area. To remove all bets, the player may simply press the ‘Remove All Bets’ button. If the player wishes to remove one or more individual bets, he may press the ‘Remove Bet’ button and then touch each of the bets to be removed. To return to normal betting after using the ‘Remove Bets’ button, the player may simply touch one of the betting selection chips.

When the player is satisfied with the bets he has placed, he may start the gaming event. Pressing the ‘BET’ button located in the bottom right of the screen starts a highlight (also called a racer herein) racing around the track. A transaction may be made to a central server coupled to the gaming machine (over a computer network, for example) and a result is returned. When the highlight (e.g., the racer) stops, the segment currently lit is the result. The player is informed if he is a winner and payout follows accordingly.

A bet transaction is not considered complete until the central server(s) has/have processed it and a bet result has been returned to the gaming terminal. If a transaction cannot be completed, the player receives his or her bet back.

In the embodiment of FIG. 33, the maximum win that may be transacted in a single event is $9550. The minimum total bet on a single event is $1. The maximum bet on a single event is $500. The Infinity paytable is given hereunder.

| | | | |
|---|---|---|---|
| a. | Bet Type | Odds | Return for $1 bet |
| b. | Color - Red | Evens | $ 2 |
| c. | Color - Light Blue | 5/2 | $ 3.50 |
| d. | Color - Yellow | 4/1 | $ 5 |
| e. | Color - Purple | 10/1 | $11 |
| f. | Shape - Circle | 6/4 | $ 2.50 |
| g. | Shape - 4 Pointed Star | 5/2 | $ 3.50 |
| h. | Shape - 7 Pointed Star | 3/1 | $ 4 |
| i. | Shape - 3 Pointed Star | 11/2 | $ 6.50 |
| j. | Shape - Three Waves | 32/1 | $33 |
| k. | Neighbors | 23/2 | $12.50 |
| l. | 1s, 2s or 3s (Low three) | 11/2 | $ 6.50 |
| m. | 16s, 17s or 18s (High three) | 9/2 | $ 5.50 |
| n. | Any 2s to 18s | 15/1 | $16 |
| o. | Any 1s | 30/1 | $31 |
| p. | Straight | 60/1 | $61 |
| q. | Infinity | 60/1 | $61 |

Figure 34:
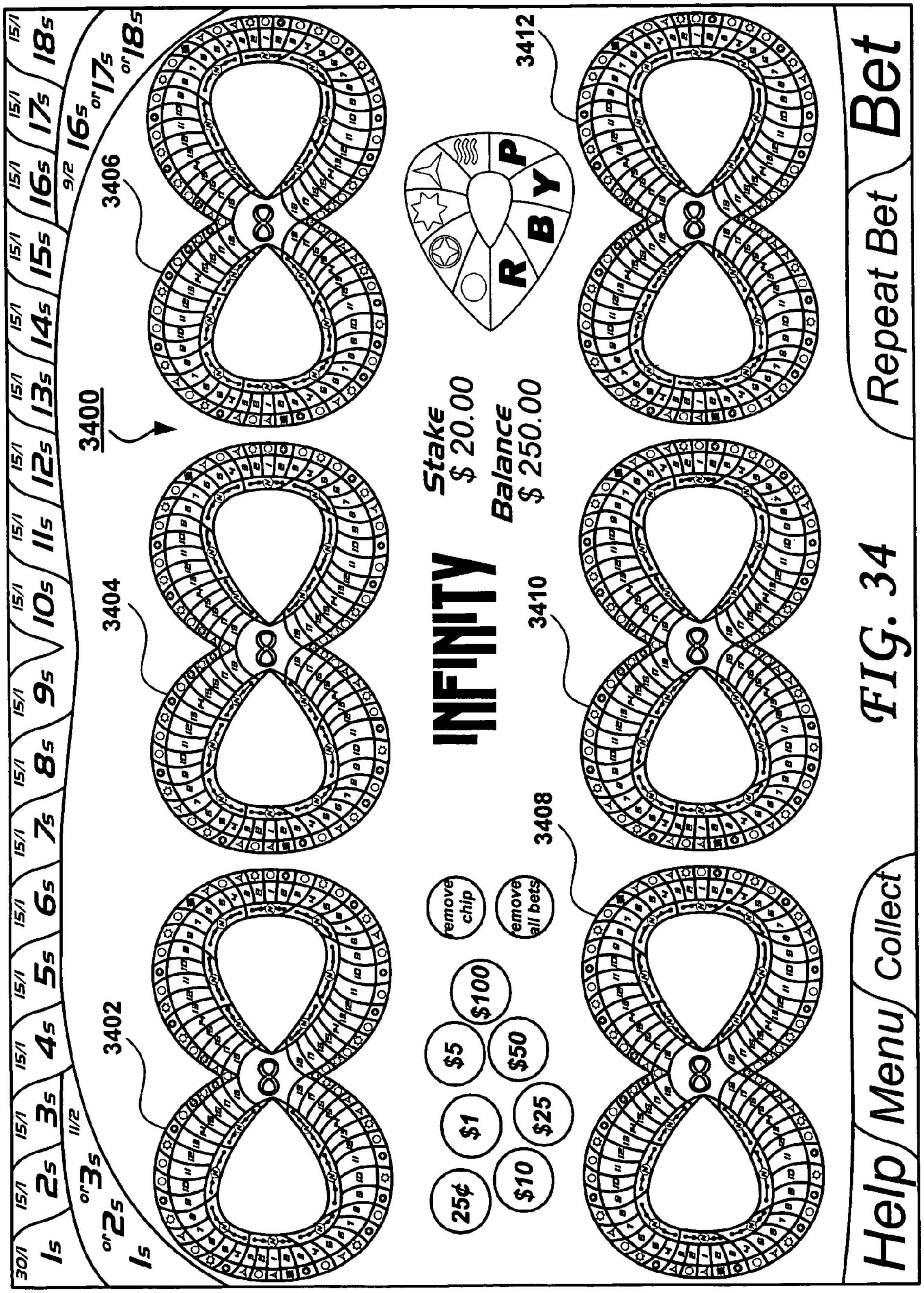
FIG. 34 shows a six-conduit mosaic allowing multiple Infinity games to be played simultaneously, according to an embodiment of the present invention.

FIG. 34 at 3400 illustrates the concept of offering mosaics of infinity-type games whereby multiple games may be played together in order to offer higher returns to the players and richer possibilities of betting on linked features, according to another embodiment of the present invention. The linked features as detailed previously may be extended across several games. For example, with the six activated games 3402, 3404, 3406, 3408, 3410 and 3412 depicted on the video screen 3400, when the payer places a bet on the "Number 3" feature, all the number 3 in the six games may be highlighted. A corresponding pay table in accordance with the probability of occurrences may be established. For example, if all the racers in all the six games do stop at segment 3, the return would be very significant.

Figure 35:
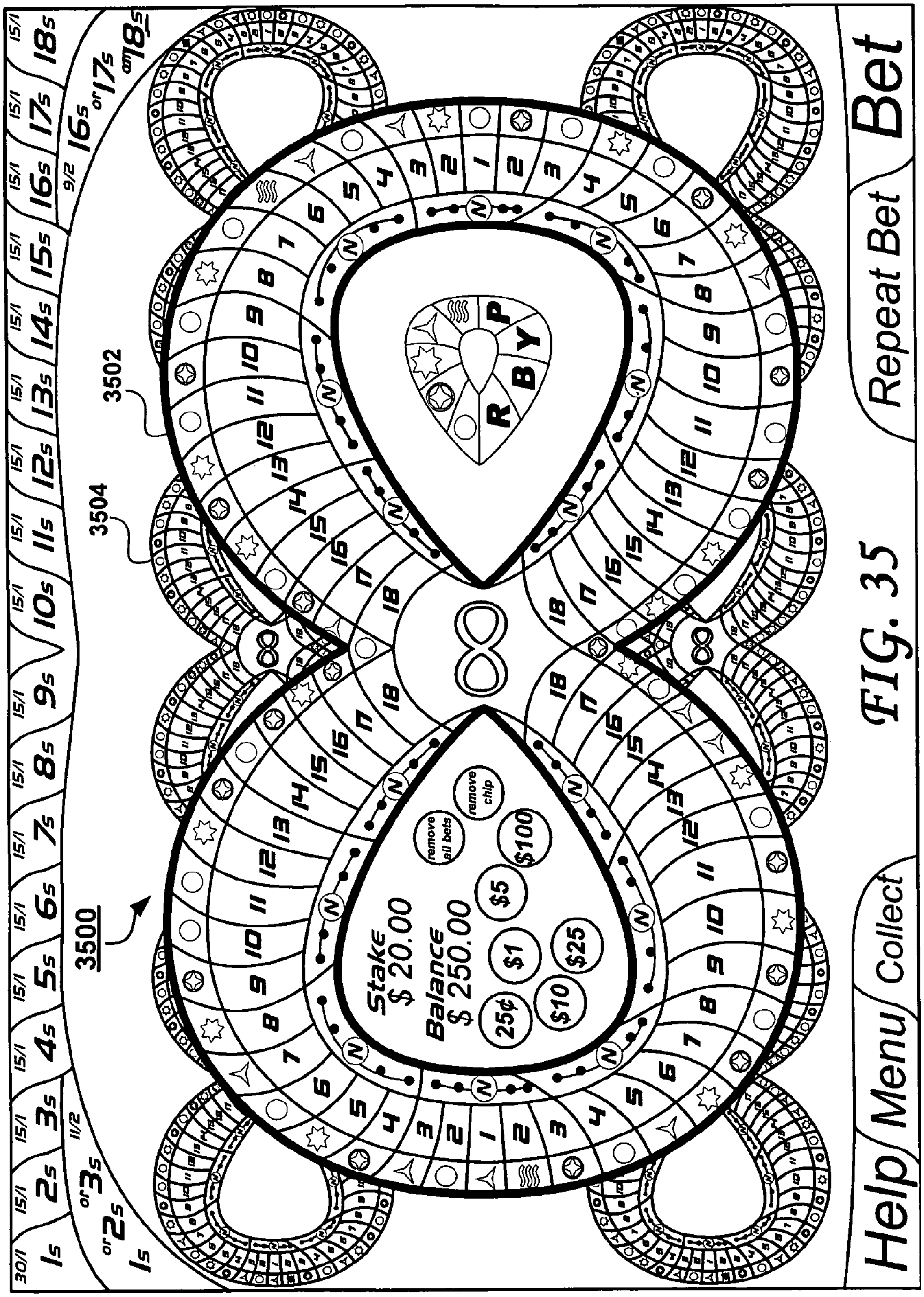
FIG. 35 shows a pop-up conduit when placing bets on a selected reduced size Infinity conduit, according to an embodiment of the present invention.

FIG. 35 at 3500 illustrates the pop-up conduit 3502, which is a larger view of the selected game 3504 in order to conveniently place the bets on that game. The pop-up 3502 is displayed when the player touches the small view of the game 3504.

Figure 36:
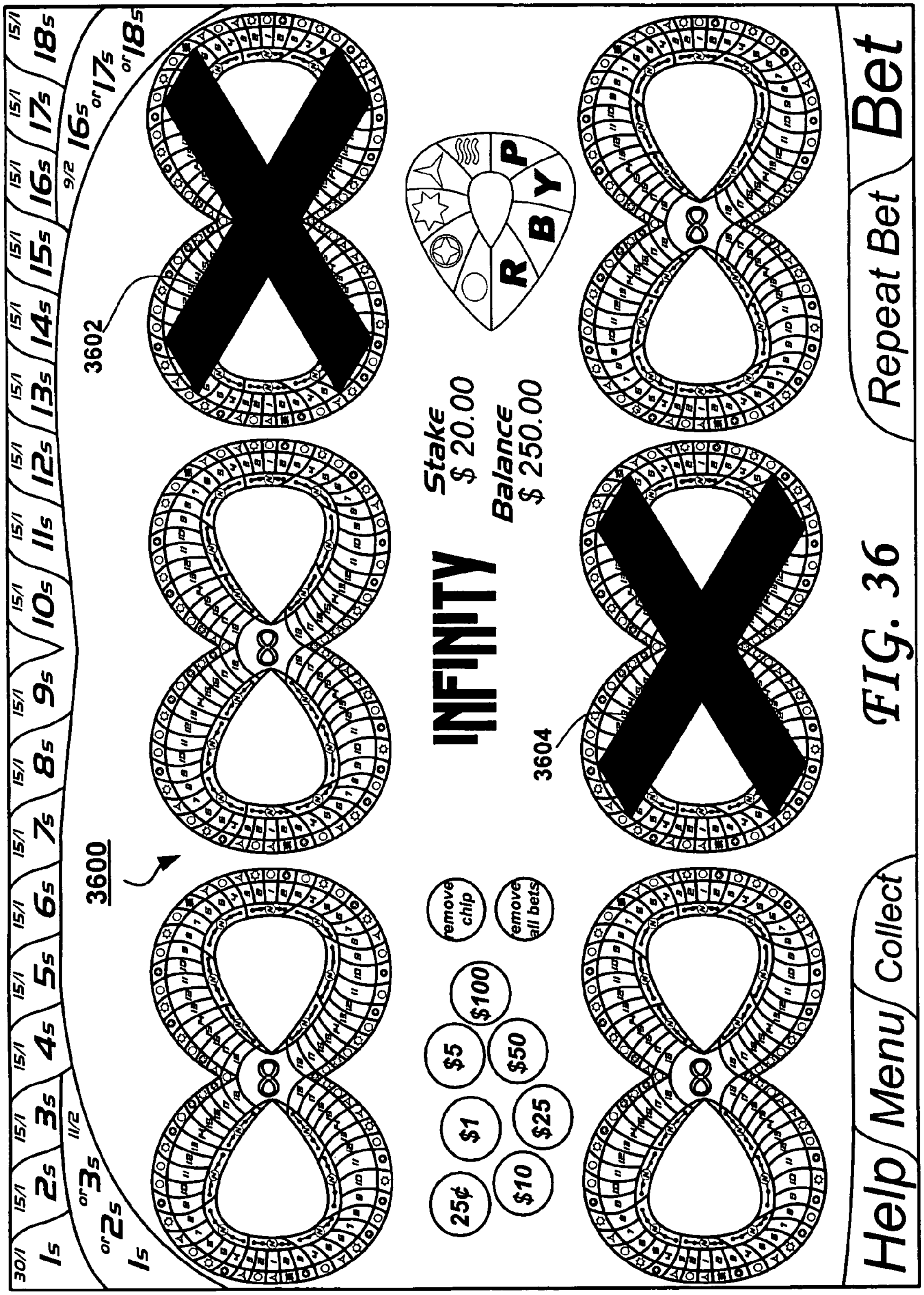
FIG. 36 shows the de-selection of some games in a six-conduit mosaic, according to an embodiment of the present invention.

FIG. 36 at 3600 illustrates the activation or de-activation of some games (six games total are shown). The games that have been deselected by the player and that are overlaid with the cross 3602 and 3604 do not participate in the game, and therefore the return calculated in the paytable is different.

In another embodiment, the player has the ability to select a number of simultaneous games on which he wishes to place bets, with various across-games linked features. For example, from one to nine games may be selected (an example with a total of six games is shown at FIG. 36). In each case, the mosaic of reduced-size games shown on the screen is accommodated for optimum viewing experience of all the games. The nine games is not an upper or lower limit and a greater or lesser number of games may be displayed on the screen and played.

Figure 37:
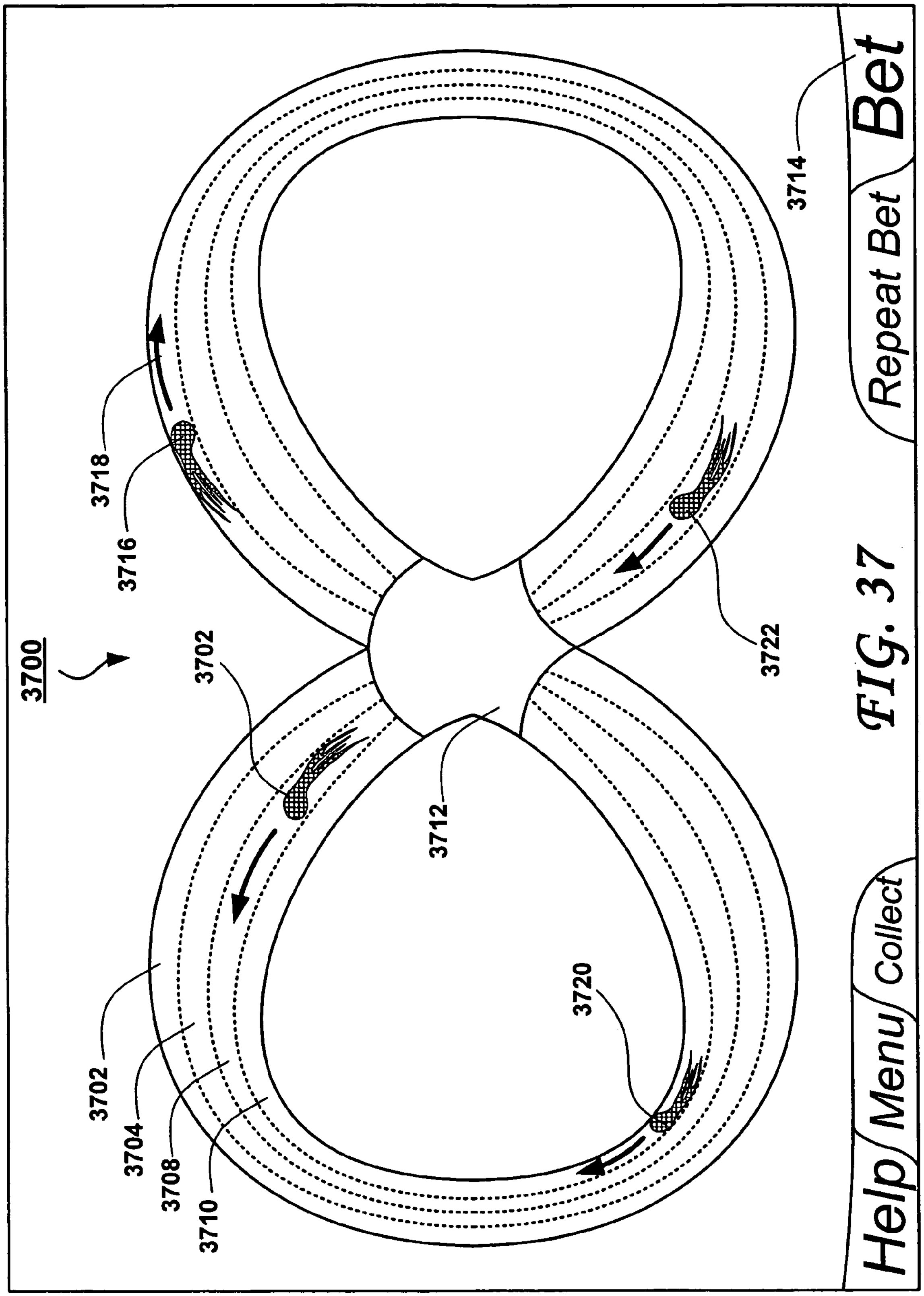
FIG. 37 illustrates the principle for a Four-track conduit allowing four racers to race simultaneously, according to an embodiment of the present invention.

FIG. 37 at 3700 illustrates an alternative to the display of mosaic of games whereby additional tracks are rendered in which several racers may run simultaneously. Here, four tracks 3702, 3704, 3706 and 3708 are shown. Racers 3710, 3712, 3714 and 3716 each race in a different track. A corresponding paytable is compiled in accordance with the probability of occurrence of the various features and linked features that may be selected by the player.

Figure 38:
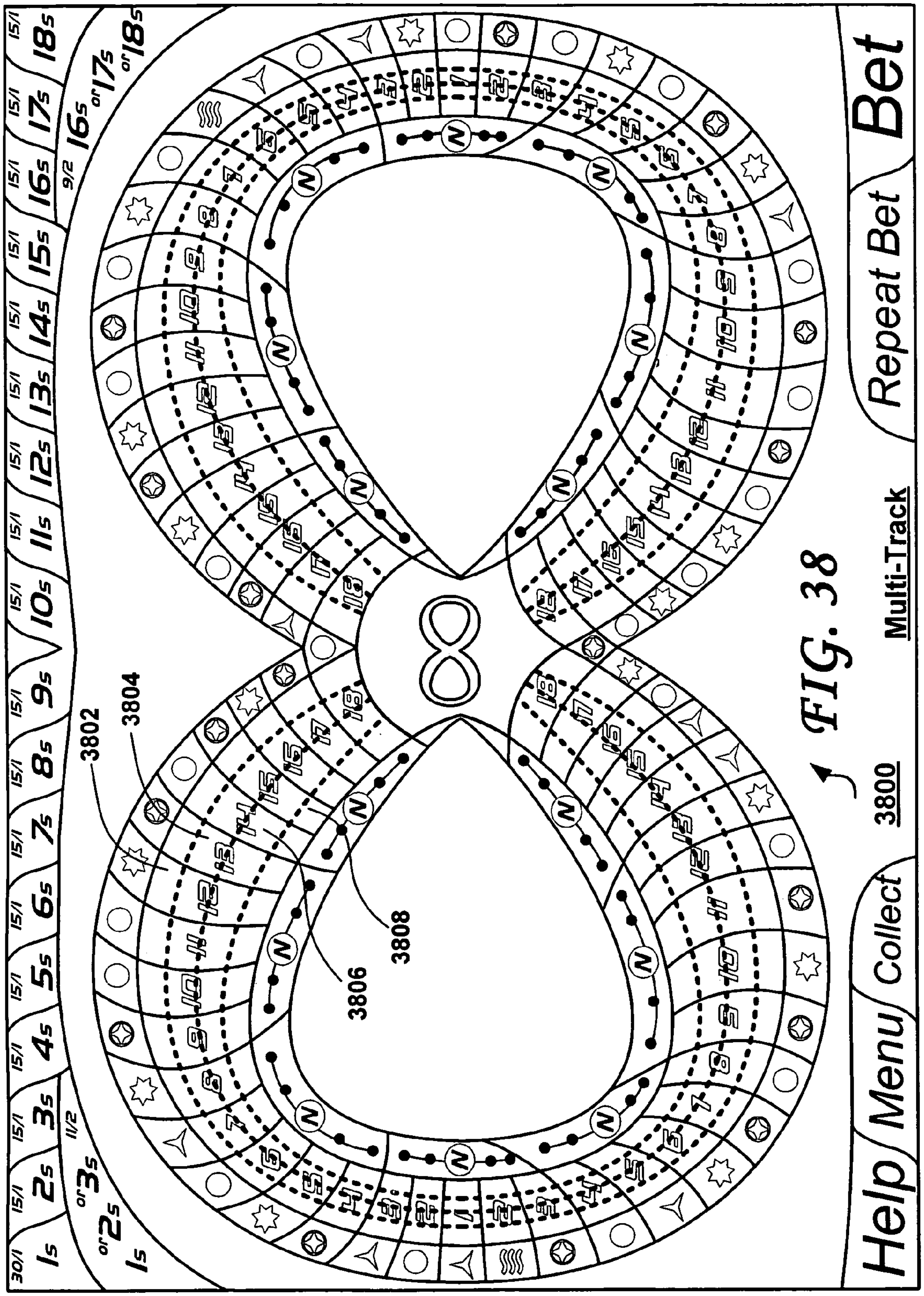
FIG. 38 shows an exemplary layout for a four-track conduit allowing multiple Infinity games to be played simultaneously, according to an embodiment of the present invention.

FIG. 38 at 3800 illustrates another embodiment of the present invention, in which the Infinity game incorporates four tracks. In this embodiment, tracks 3802, 3804, 3806 and 3808 guide four racers simultaneously in the slot-machine video game.

Figure 39:
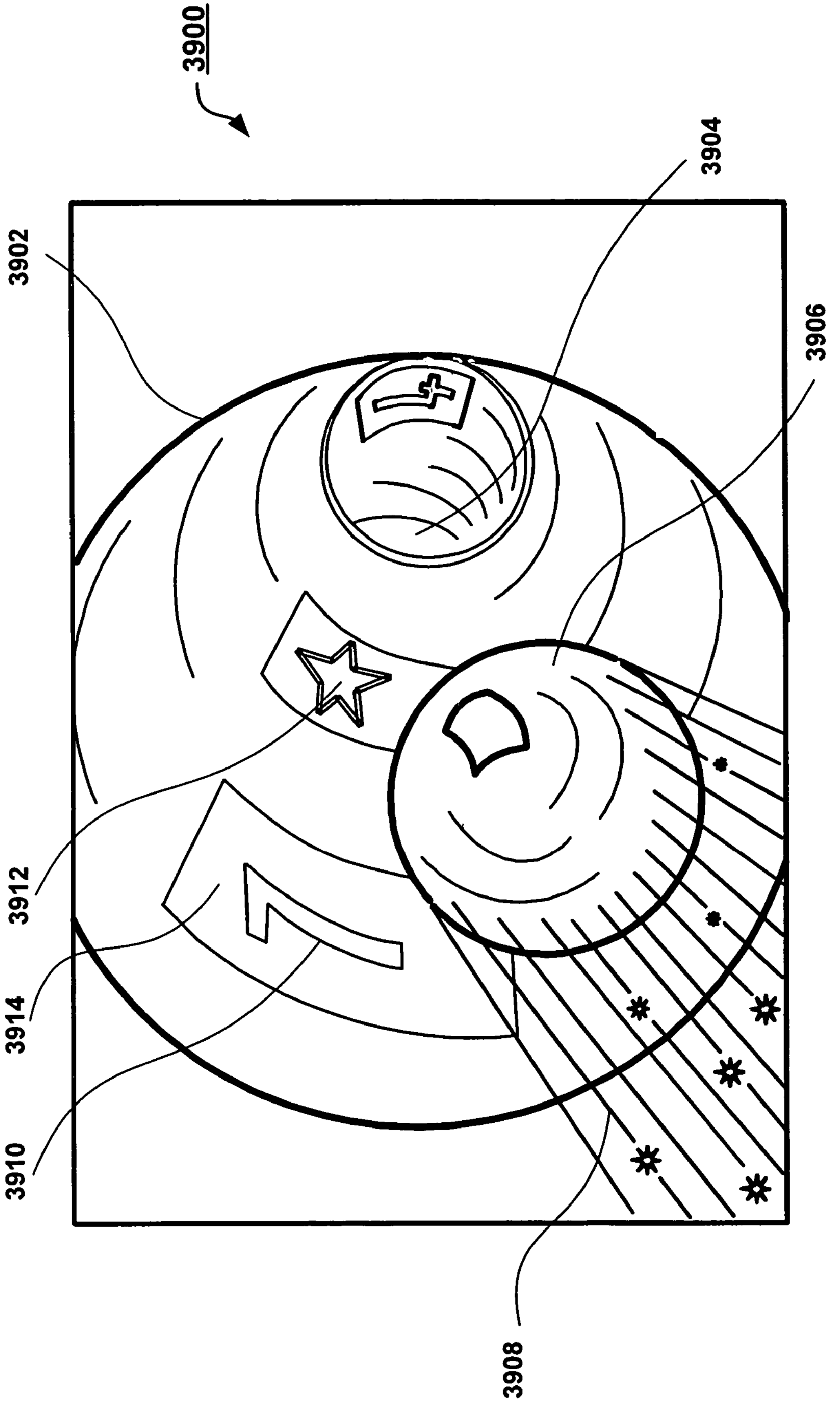
FIG. 39 shows a racer "Follow-Behind" perspective view, according to an embodiment of the present invention.

FIG. 39 illustrates another embodiment of the present invention, and highlights the racer "Follow-Behind" perspective view. Indeed, FIG. 39 at 3900 illustrates a racer represented by a ball 3906 followed with luminous sparks and tail 3908 racing at very high speed within a conduit 3904 of circular section 3902 as it could be seen by an observer following the ball. As the features 3910, 3912 rendered on the inner walls 3914 of the conduit tunnels 3904 are passing fast and the tunnels twists as approaching bends 3904, the observer experiences a vertigo effect similar to the feeling experienced by a rider on a roller coaster.

Figure 40:
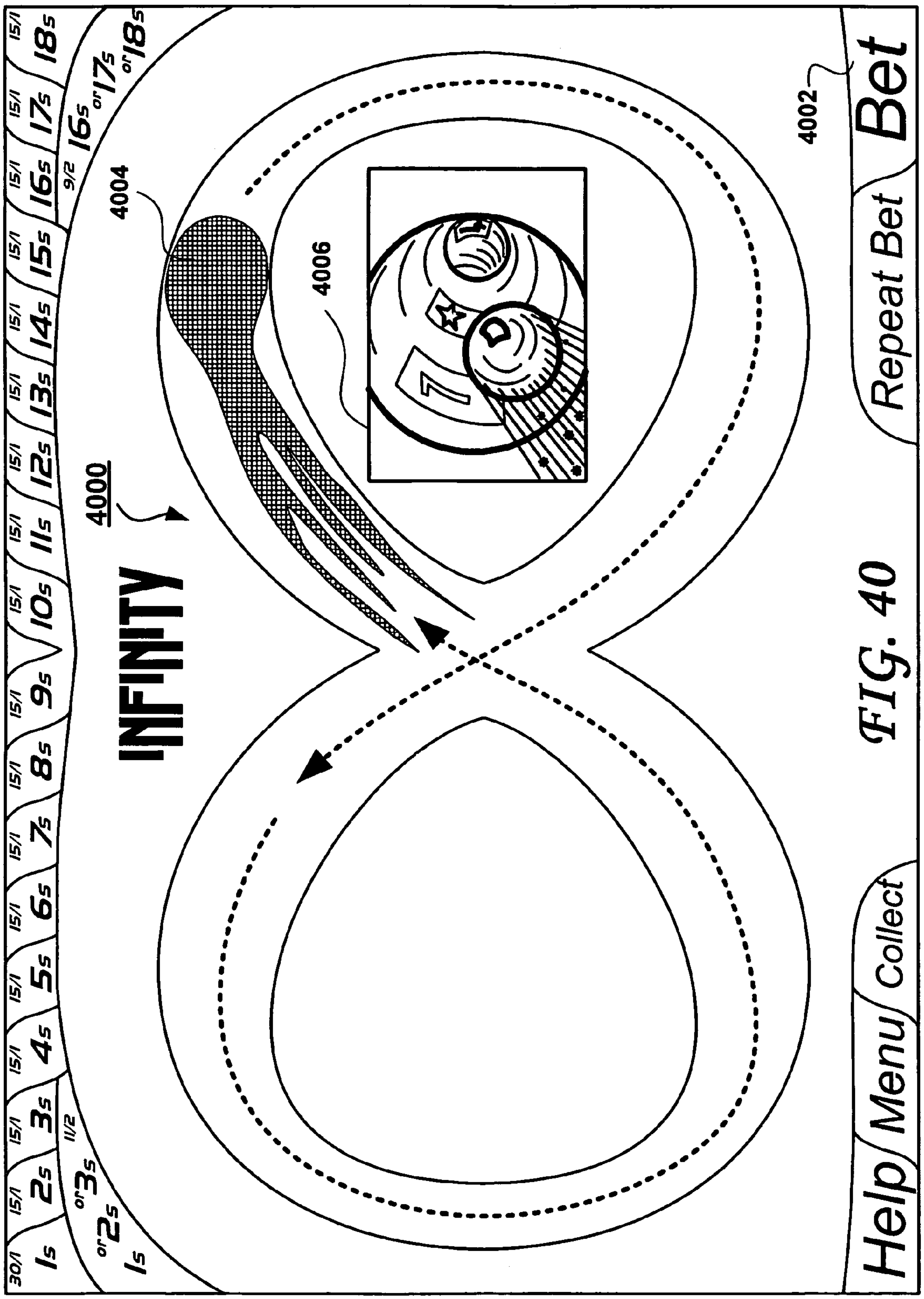
FIG. 40 shows a video insert of a perspective-view-from-behind racer during a game draw, according to an embodiment of the present invention.

FIG. 40 at 4000 shows a video insert of the perspective-view-from-behind racer shown in FIG. 39 during a game draw. As shown, the video or animation of the racer 4004 may be inserted in a window 4006. The scene illustrated in FIG. 39 may be inserted as a video-insert video 4006 inside the right loop (for example) of the present Infinity game and may show a synchronized follow-behind perspective view of the racer 4004 as it races around the conduit of a circular section subsequent to the player pressing the bet button 4002.

Figure 41:
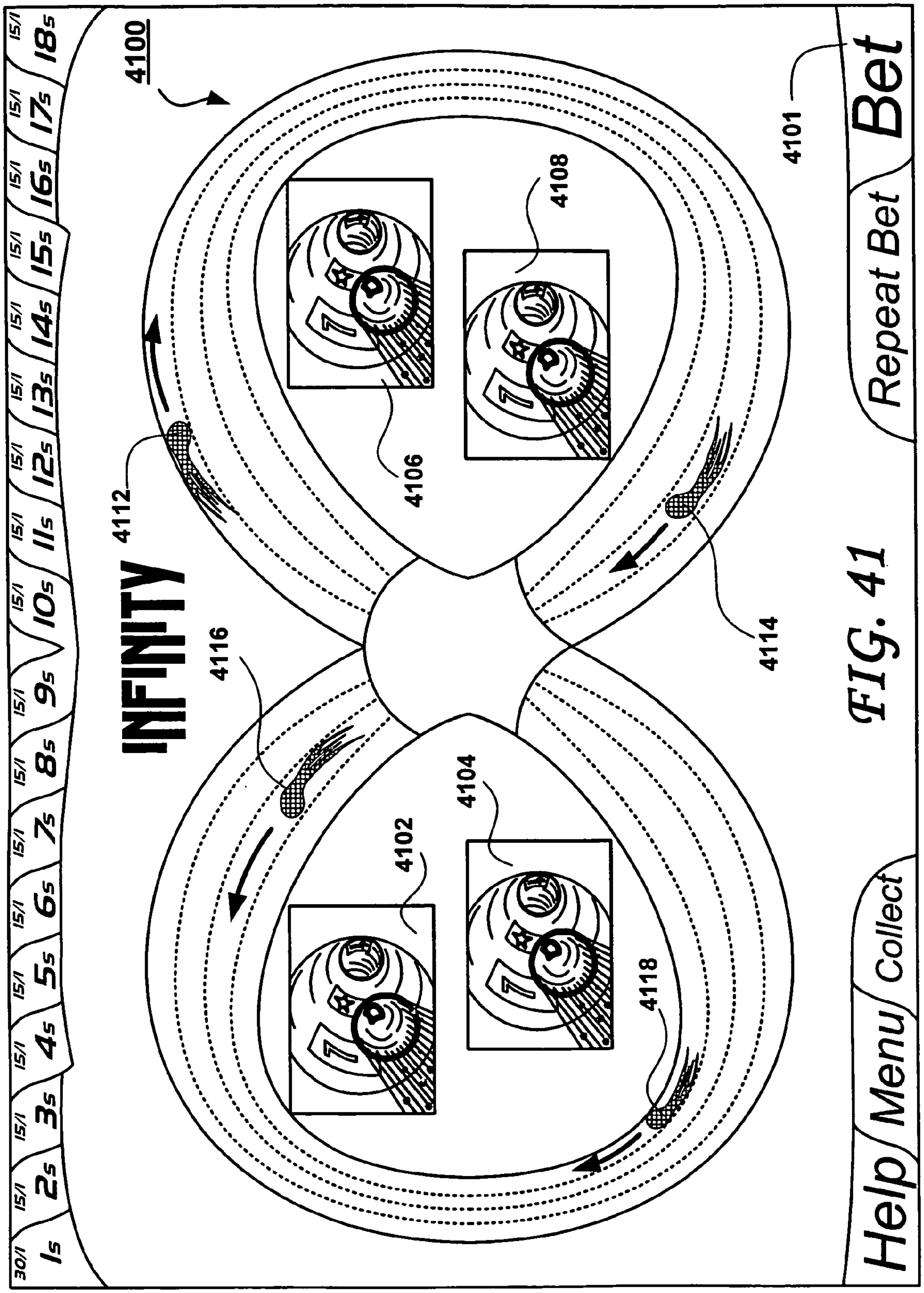
FIG. 41 shows a four video insert of a perspective-view-from-behind racer during a 4-track game draw, according to an embodiment of the present invention.

FIG. 41 shows yet another embodiment of the present invention, featuring a four video insert of the perspective-view-from-behind racer during a four track game draw. As shown, FIG. 41 illustrates a four track, four racer (4112, 4114, 4116, 4118) game with four video inserts (4102, 4104, 4106, 4108) each showing a follow-behind view of one the racers subsequent to the player pressing the bet button 4002.

FIG. 42 at 4200 illustrates the rendering of the game animation on a physical 3D solid warped conduit layered with flexible LCD panels, according to another embodiment and implementation of the present invention. This embodiment of the Infinity game makes use of a separate element for rendering the linked features and the animation of the racer. The player places bets on a separate device, for example by placing physical chips on a casino table depicted at FIG. 11 or any other way of entering bets via an interactive computer device. The computer controlling the validation of bets placed by the player, the computer controlling the game and the computer controlling the 3D solid animation may be linked together. In this embodiment and the other embodiments described herein, a single computer may carry out all of the computational functionality required to carry out the game functions. Alternatively, some or all of the rendering, security and game processing may be carried out by one or more servers coupled to the game machine implementing the present invention via a secure computer network.

The 3D solid warped conduit (hereafter called 3D video conduit) may be entirely or partially covered with flexible video LCD panels. It is expected that such flexible video LCD panels produced on flexible plastic sheets instead of rigid glass will be in mass production in the near future. The flexible video LCD panels 4202, 4204, 4206, 4208, 4210 may be tiled and controlled by a computer system in such a fashion as to offer a continuous video strip displaying the racer 4220 as it races along the conduit 4200. Interesting and pleasing video affects may be achieved to render high speed and motion blur. All the features such as shapes 4212, 4216, numbers 4214, 4218, and colors may be rendered. The 3D video conduit may be covered fully or partially with color LEDs, illumined color panels or flexible video panels or a combination thereof. The 3D video conduit may be placed on a table, a stand or suspended above in the air for optimum viewing by the players. Indeed, the 3D video conduit may be rendered on a conventional video screen using advanced 3D animation techniques, offering for example a 3D visualization on a slot machine of the Infinity game.

An embodiment of the Infinity game uses the Möbius strip 302, 304 as a conduit. The Möbius strip may be video rendered as a meshed strip as shown at 4304 in FIG. 43 or as a partially transparent strip. In this game, the player may in addition to placing bets on the features described previously, place a bet on the apparent surface where the racer stops. Considering a given segment location, the racer may stop on the apparent top side of the segment, and on the following lap, may stop on the apparent bottom side of the segment.

An alternative embodiment is the construction of a physical 3D solid warped conduit adopting the Möbius strip topology, whereby the strip surface is layered with flexible video LCD panels, color LEDs panels, illuminated color panels or a combination thereof. A racer or racers may be video rendered as ants such as depicted at 4302 on FIG. 43, or any other interesting video effect.

Figure 43:
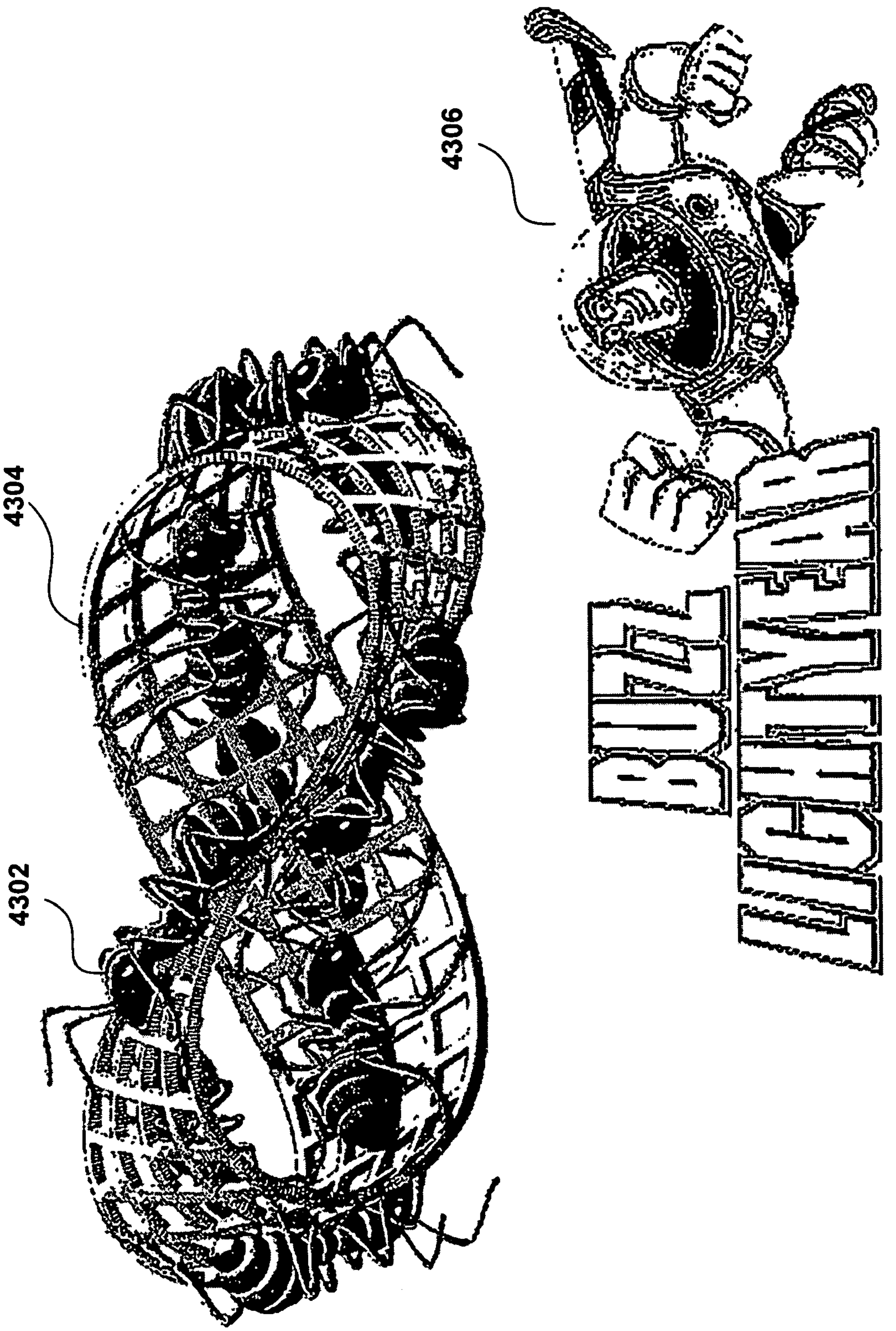
FIG. 43 shows possible candidate characters for the racer, according to an embodiment of the present invention.

FIG. 43 illustrates candidate characters to be rendered as the racer or racers. In the case of ants, indeed several ants may be racing on a single tack and crawl over/under each other when passing over (running in the same direction) or when crossing (running into in the opposite direction). In the same manner as casino fruit machines have evolved to offer other symbols instead of fruits, such as animals and familiar objects associated to a given theme, then evolved to offer pictures of famous cartoon, TV or movie characters such as appear in popular television, carton and movies such as the Flintstones, Fred Aster, Marilyn Monroe, Bewitched and the like. It is noted that use of such characters may require obtaining licensing rights from the respective trademark owners. For example, the present Infinity game and Beyond-Infinity-type games may evolve to use licensed characters such as Buzz Lightyear® (to be licensed from Pixar and Disney). Indeed, the game may show an animation of Buzz Lightyear going into a journey into the Infinity and Beyond warped space by going around the Infinity conduit at Warp Speed. The features to place bets on may be planets, galaxies, the other characters in Toy Story, alien figures, zodiac signs, etc.

Other possible candidates for racers are the Pods of the pod race in Star Wars Episode 1, the Enterprise starship in Star Trek® television series and Harry Potter® racing on a witch's broom. Indeed, a rich set of visual features taken from the movies may be rendered in association with these characters, upon securing necessary rights thereto.

CONCLUSIONS

The present invention described and shown herein is a simple game that is as easy to play as the very successful games found in casinos. The game is readily amenable to many interesting and rich variants. The visual effects created by the speedy racer traveling along the infinity conduit has a sort of hypnotic effect that is already proving very captivating according to an early market test campaign.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

What is claimed is:

1. A computer-controlled game comprising:

a computer system;

at least one conduit, each of the at least one conduit defining a predetermined closed path, the predefined path defining at least two loops and at least one intersection joining the at least two loops;

at least one racer, each of the at least one racer being controlled by the computer system to race along the at least one conduit from a start location, the at least one racer being controlled by the computer system to race within the at least one conduit along the at least two loops and crossing the at least one intersection, the at least one racer being controlled to stop at a random stop location along the at least one conduit;

a plurality of selectable features, the plurality of selectable features being disposed at least one of within, along and adjacent the at least one conduit, one of the plurality of selectable features being disposed at each of the at least one intersection;

user interaction means for selectively highlighting at least one of the plurality of selectable features;

means for linking selected ones of the plurality of features;

means for selectively placing bets on the selected features and linked features;

means for starting the computer-controlled game;

means for determining an outcome coupled to the computer system, the outcome being determined in accordance with the bets placed and the stop location of each of the at least one racer, wherein the racer has a greater probability of stopping at the intersection than at other ones of the stop locations and wherein the outcome determining means is configured to take at least the greater probability into account when determining the outcome when the random stop location is at the intersection.

2. A computer-controlled game according to claim 1, wherein each of the at least one conduit is a three dimensional structure and is defined by a surface formed by one or more solid arcuate luminous panels.

3. A computer-controlled game according to claim 2, wherein the arcuate luminous panels include at least one of LED panels and flexible video LCD panels.

4. A computer-controlled game according to claim 1, wherein the at least one conduit is a representation of a three-dimensional structure rendered on a display of a gaming terminal.

5. A computer-controlled game according to claim 1, wherein the at least one conduit defines a selectable cross sectional profile.

6. A computer-controlled game according to claim 5, wherein the selectable cross sectional profile is selected from a rectangular cross section, a circular cross section, an oval circular cross section, a triangular cross-section and an irregular cross section.

7. A computer-controlled game according to claim 1, wherein the at least one conduit is a representation of a two-dimensional structure rendered on a display of a gaming terminal.

8. A computer-controlled game according to claim 1, wherein the game is rendered on a display of a gaming terminal.

9. A computer-controlled game according to claim 1, wherein the at least two loops and the at least one intersection collectively define a shape of the infinity symbol and wherein the at least one racer is controlled by the computer system to describe a figure 8 path within the infinity symbol-shaped conduit.

10. A computer-controller game according to claim 1, wherein each of the at least one computer-controlled racer includes one of a physical object, a character representation and a luminous effect on a computer screen.

11. A computer-controlled game according to claim 1, wherein the start location of each of the at least one racer is one of a predetermined location and a random location within the at least one conduit.

12. A computer-controlled game according to claim 1, wherein the plurality of features include at least one of numbers, top-3 numbers, bottom-3 numbers, middle numbers, side numbers, 5-neighbors, 3-neighbors, 7-neighbors, colors, shapes, symbols, pictures, sound, video animations, characters, animals, personages, and directions.

13. A computer-controlled game according to claim 1, wherein the means for placing bets on the features and the linked features is a casino style game table having means for accepting the bets into the computer system.

14. A computer-controlled game according to claim 1, wherein the game includes at least two racers controlled by the computer system and configured to race within the at least one conduit.

15. A computer-controlled game according to claim 14, wherein the at least two racers are configured to race within the at least one conduit in opposite directions.

16. A computer-controlled game according to claim 14, wherein at least one of the racers is configured to change directions within the at least one conduit before stopping at the stop location.

17. A computer-controlled game according to claim 1, wherein the computer system includes a central server coupled to and remote from the computer-controlled game.

18. A computer-controlled game according to claim 1, wherein the computer system is a stand-alone computer within the computer-controlled game.

19. A computer-controlled game according to claim 1, further including a random number generator, an output of the random number generator controlling the stop location at which the racer is controlled to stop.

20. A computer-controlled game according to claim 1, further including payout means configured to pay out on placed bets when the stop location at which the at least one racer is controlled to stop faces a highlighted feature.

21. A computer-controlled game according to claim 1, whereby when a plurality of racers are racings in the same game then the plurality of racers stopping at the same location is a feature on which the player may place a bet for predicting the location where the plurality of racers will stop.

22. A computer-controlled game according to claim 1, whereby when the defined path projected to a 2D surface defines at least one crossing then a bonus is won when the racer stops a predetermined number of times at a predetermined combination of at least one crossing.

23. A computer-controlled game according to claim 1, whereby when the defined path projected to a 2D surface defines a plurality of crossings, a selected set of the plurality crossings is a selectable feature on which the player may place a bet for predicting the location where the racer will stop.

24. A computer-controlled game according to claim 1, whereby when a plurality of racers are facings in the same game then a bonus is won when the plurality of racers stop at the same location.

25. A computer-controlled game according to claim 1, whereby when a plurality of racers are facings in the same game and when the defined path projected to a 2D surface defines at least one crossing then a selected set of the at least one crossing where the plurality of racers will stop is a feature on which the player may place a bet for predicting the selected set of the at least one crossing where the plurality of racers will stop.

26. A computer-controlled game according to claim 1, whereby when a plurality of racers are facings in the same game and when the defined path projected to a 2D surface defines at least one crossing then a bonus is won when the plurality of racers stop at a selected one of the at least one crossing.

27. A computer-implemented method for providing a player with an electronic game of chance, comprising the steps of:

providing a conduit or representation of a conduit that has a shape of the infinity symbol ∞ that defines two loops and an intersection joining the two loops;

providing at least one racer or a representation thereof, each of the at least one racer being computer controlled to race along the at least one conduit from a start location such that the racer alternately crosses the intersection in a first direction and in a second direction opposite the first direction;

providing a plurality of player selectable features, the plurality of selectable features being disposed at least one of within, along and adjacent the at least one conduit, one of the plurality of selectable features being disposed at the intersection;

providing player interaction means to enable the player to selectively highlight at least one of the plurality of selectable features;

providing the player with means for the user to place a bet that the at least one racer will stop on a highlighted feature;

providing the player with means for starting the computer-controlled game;

providing a random number generator;

responsive to a random number generated by the random number generator, controlling the at least one racer to stop at a random stop location along the at least one conduit, wherein the racer has a greater probability of stopping at the intersection than at other ones of the stop locations;

determining an outcome of the computer-controlled game, the outcome being determined in accordance with the bets placed and the stop location of each of the at least one racer, wherein the outcome determining step takes at least the greater probability into account when determining the outcome when the random stop location is at the intersection and the selectable feature at the intersection is highlighted.

28. A computer-controlled game of chance, comprising:

a track that defines two loops and an intersection joining the two loops to define a shape of the infinity symbol ∞, the track being divided into a plurality of segments, the plurality of segments including a segment at the intersection;

a racer configured to race around the track from a start segment to a randomly chosen stop segment such that the racer races crosses the intersection as it races from one of the two loops to the other of the two loops;

betting apparatus enabling a player of the computer-controlled game to place a bet on which of the plurality of segments the racer will stop, wherein a probability that the racer will stop at the intersection is greater than a probability that the racer will stop at other segments of the track, and payout apparatus enabling the player to be paid according to predetermined odds if the randomly chosen stop segment is the segment on which the player has placed the bet, wherein the payout apparatus takes at least the greater probability into account when enabling the player to be paid for a bet placed on the segment at the intersection.

* * * * *